United States Patent
Tabuchi

(10) Patent No.: US 7,130,504 B2
(45) Date of Patent: Oct. 31, 2006

(54) OPTICAL DEMULTIPLEXING DEVICE AND OPTICAL MONITORING DEVICE

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/192,092

(22) Filed: Jul. 29, 2005

(65) Prior Publication Data

US 2006/0215960 A1 Sep. 28, 2006

(30) Foreign Application Priority Data

Mar. 25, 2005 (JP) .............................. 2005-089978

(51) Int. Cl.
G02B 6/26 (2006.01)
G02B 6/34 (2006.01)
H04J 14/02 (2006.01)

(52) U.S. Cl. ..................... 385/24; 385/37; 385/42; 385/129; 385/130; 385/43; 385/45; 385/132; 398/82; 398/87

(58) Field of Classification Search ............... 385/37, 385/24
See application file for complete search history.

(56) References Cited

U.S. PATENT DOCUMENTS 6,137,604 A * 10/2000 Bergano ..................... 398/1
6,181,449 B1 * 1/2001 Taga et al. .................. 398/9
6,389,201 B1 * 5/2002 Urino ....................... 385/43
6,697,552 B1 * 2/2004 McGreer et al. ............. 385/37
6,701,090 B1 3/2004 Hatayama et al. ............ 398/79
6,826,331 B1 * 11/2004 Barwicz et al. .............. 385/37
2002/0057869 A1 * 5/2002 Kaneko ..................... 385/24
2003/0053750 A1 * 3/2003 Yang et al. .................. 385/27
2003/0081898 A1 * 5/2003 Tabuchi et al. .............. 385/37
2003/0165286 A1 * 9/2003 Ikushime et al. ............ 385/24

FOREIGN PATENT DOCUMENTS

JP 57161842 A * 10/1982
JP 11-340920 12/1999
JP 2001-44938 2/2001

* cited by examiner

Primary Examiner—Michelle Connelly-Cushwa
Assistant Examiner—Rhonda S. Peace
(74) Attorney, Agent, or Firm—Bingham McCutchen LLP

(57) ABSTRACT

An optical demultiplexing device used in an optical monitoring device includes an input port and an output port unit including a plurality of ports, and separates a WDM light of plural channels, which is input from the input port, for each wavelength to output to the output port unit. The output port unit includes a plurality of output port sets each of which includes at least two individual output ports as a set, and crosstalk between adjacent individual output ports in a single output port set is larger than crosstalk between adjacent individual output ports belonging to different output port sets.

18 Claims, 25 Drawing Sheets

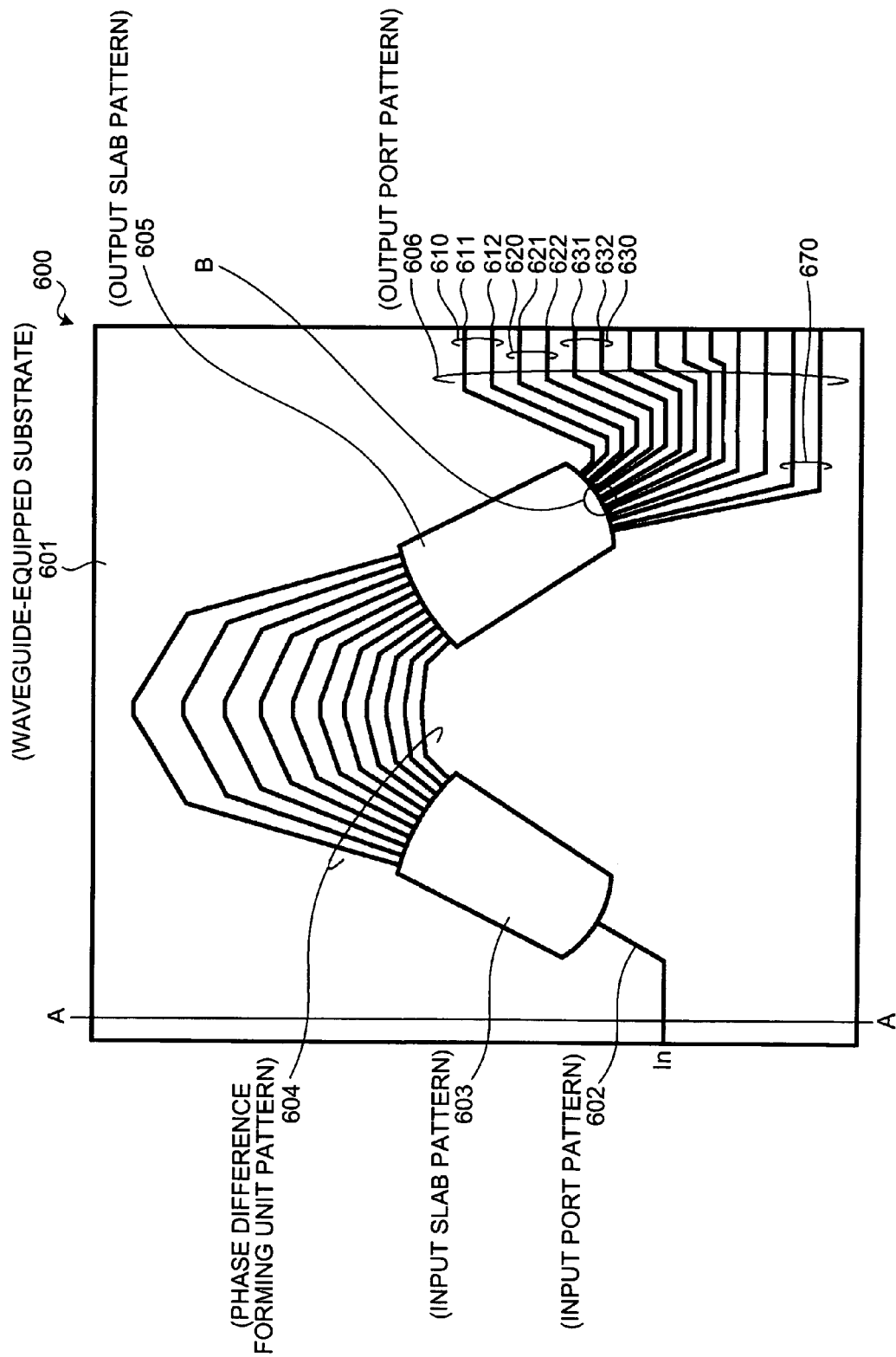

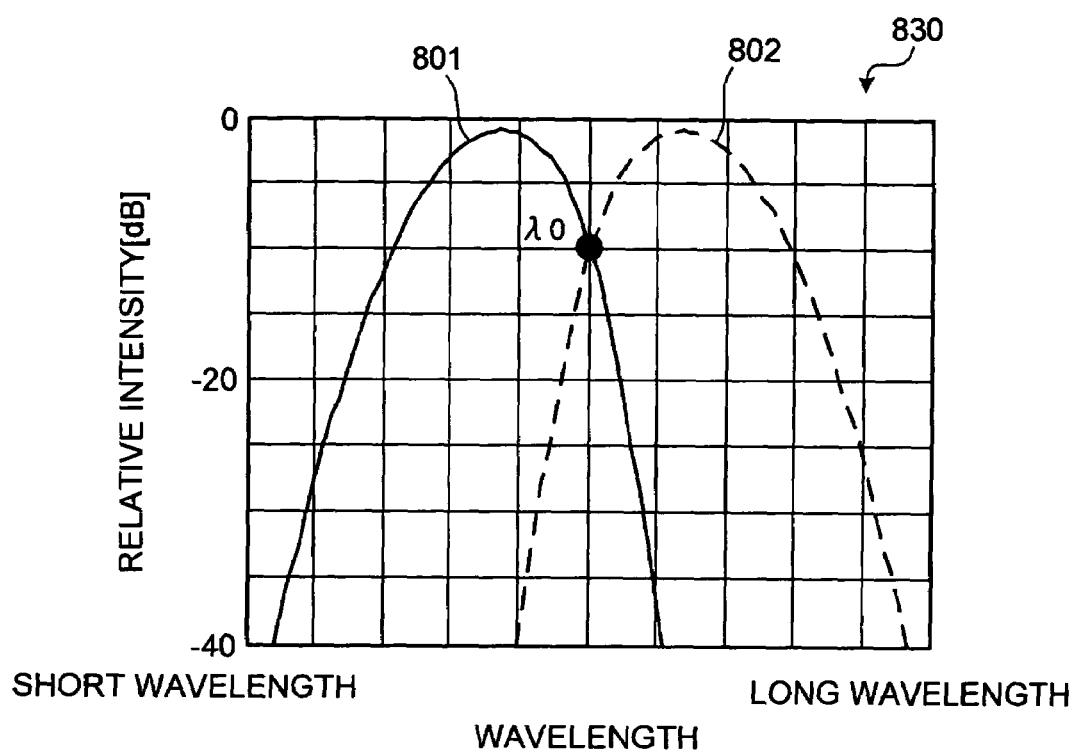

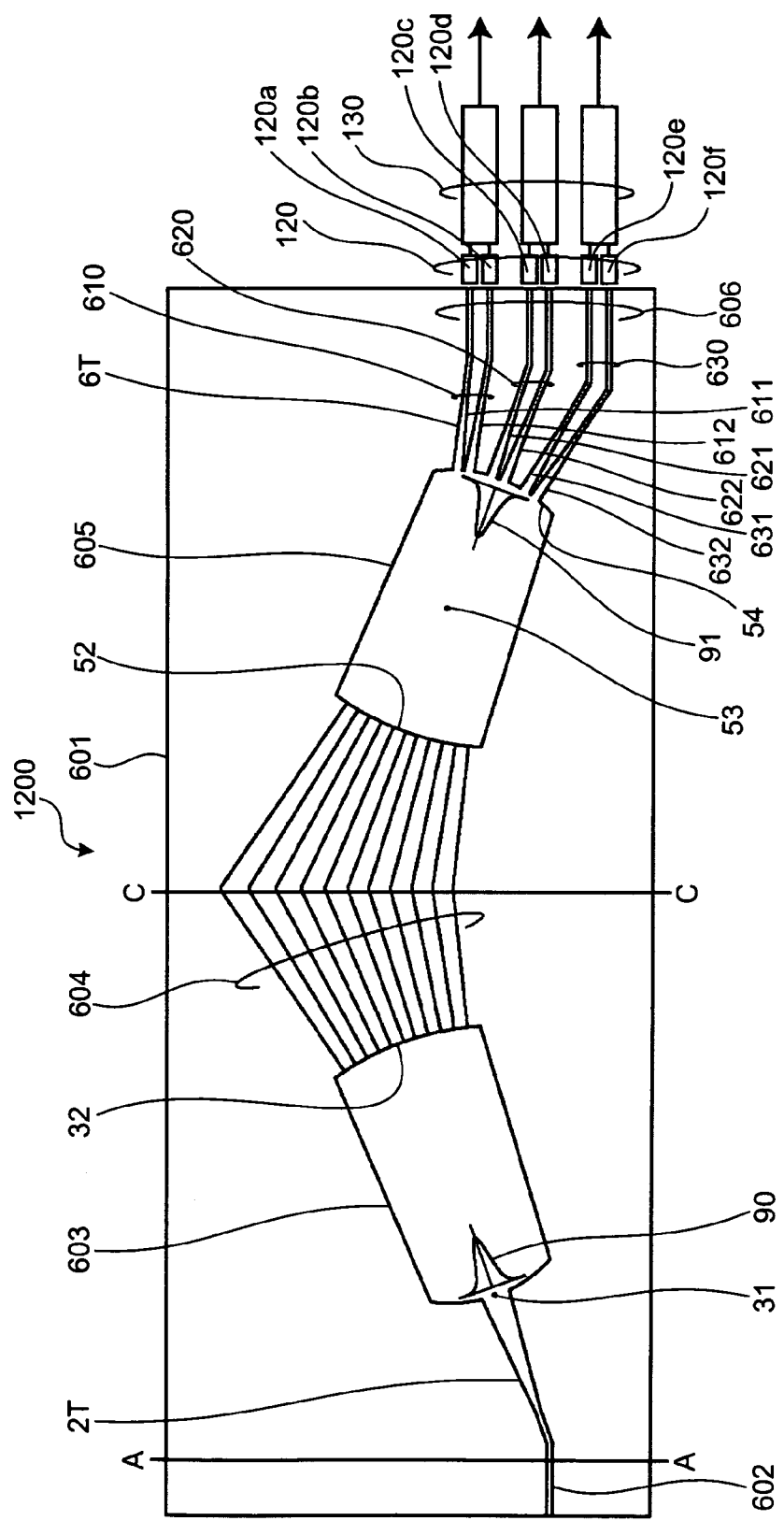

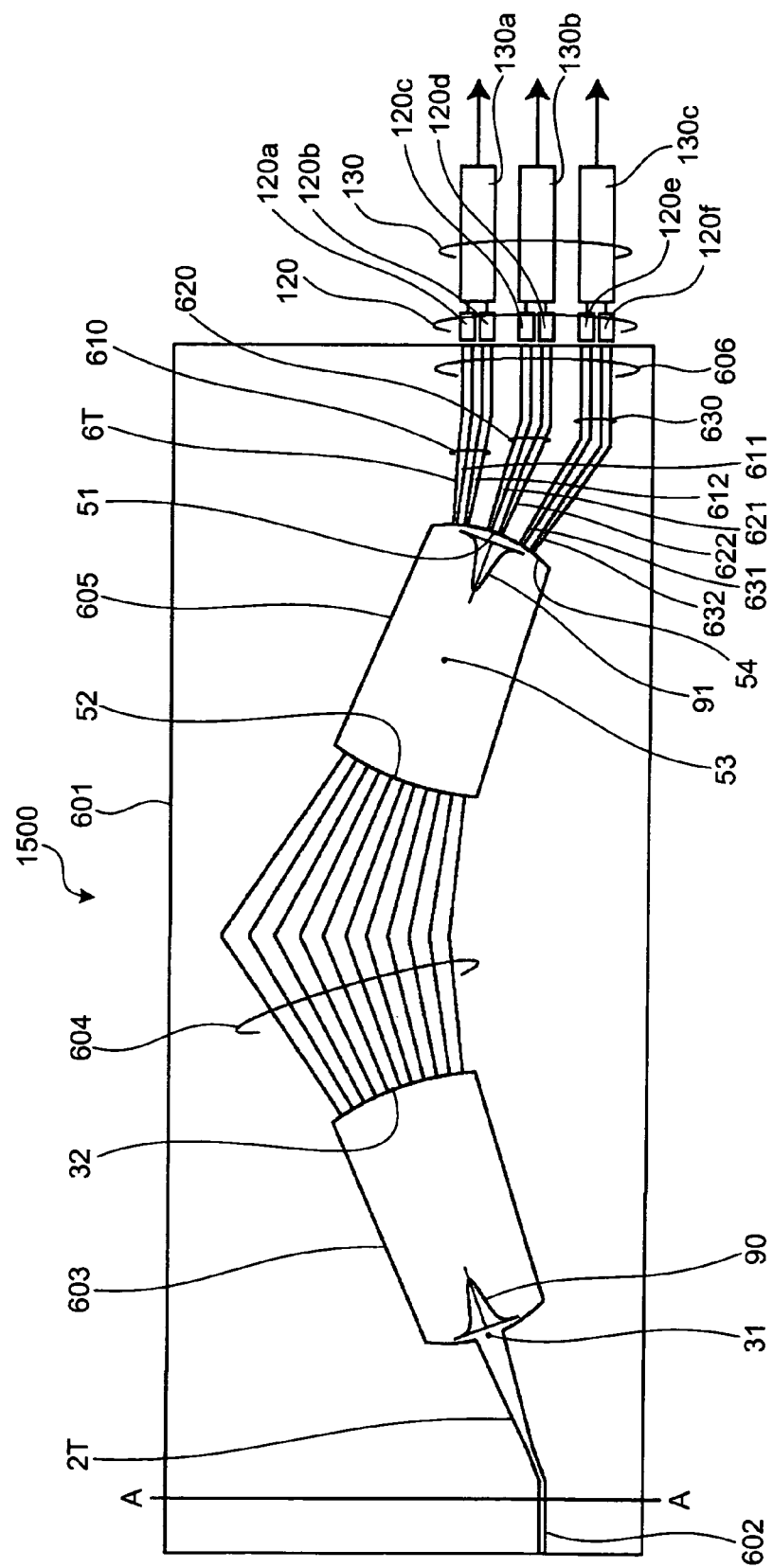

OPTICAL DEMULTIPLEXING DEVICE AND OPTICAL MONITORING DEVICE

CROSS-REFERENCE TO RELATED APPLICATIONS

This application is based upon and claims the benefit of priority from the prior Japanese Patent Application No.2005-089978, filed on Mar. 25, 2005, the entire contents of which are incorporated herein by reference.

BACKGROUND OF THE INVENTION

1. Field of the Invention

The present invention relates to an optical monitoring device that monitors an intensity and a wavelength of light for each wavelength channel in an optical fiber communication using wavelength division multiplexing (WDM), and an optical demultiplexing device incorporated in the optical monitoring device.

2. Description of the Related Art

In conventional WDM transmission schemes in which optical signals of different wavelengths are multiplexed to increase a transmission capacity, a wavelength and a light intensity are monitored by an optical monitoring device for each optical signal channel. FIG. 23 is a schematic of a conventional optical monitoring device. An optical monitoring device 10 includes an optical demultiplexing unit 11 and optical-electrical conversion units 12. The optical-electrical conversion units 12 are provided as many as number of wavelengths multiplexed.

Multiplexed light (hereinafter, "WDM light") having more than one wavelength is input to input an optical signal from an optical input port "In". The WDM light is demultiplexed by the optical demultiplexing unit 11 for each wavelength. The optical signal is output to an output port 13 for each channel as single-wavelength light, and is input to the optical-electrical conversion unit 12 to be converted into an electrical signal according to an intensity. The electric signal is output to an output port "Out" as light intensity information for each wavelength.

FIG. 24 is a schematic of the optical demultiplexing unit in the optical monitoring device 10 shown in FIG. 23. As shown, the optical demultiplexing unit 11 is implemented by, for example, an arrayed waveguide grating (AWG). A configuration and a function of the AWG is disclosed in, for example, "IEEE Journal of Selected Topics in Quantum Electronics" volume 2, number 2, June, 1996 pp. 236–250 by Smit, M. K. and Van Dam, C. The optical-electrical conversion unit 12 ($12a$ to $12m$) is implemented by, for example, a photodiode. As shown, the optical demultiplexing unit 11 and the optical-electrical conversion unit 12 are integrated on a single substrate 20 in a monolithic manner. Therefore, an assembly work is not required, and a downsized device can be obtained. Such a technology is disclosed in, for example, "Electronics Letters" volume 31, number 7, pp. 581–582, 1995, by M. Ziringible et al., and "IEEE Photonics Technology Letters", volume 10, number 11, pp. 1614–1616 by M. Kohtoku et al. Such a spectroscopic unit such as the optical demultiplexing unit 11 is formed with a filter allowing light of a specific wavelength range to pass, that is, a filter with a low optical transmission loss of a specific wavelength range.

FIG. 25 is a graph of an optical transmission loss in the spectroscopic unit in the conventional optical monitoring device. A vertical axis represents an optical transmission loss, and a horizontal axis represents a wavelength of transmission light. As shown, the conventional optical demultiplexing unit 11 has an optical-transmission-loss characteristic such that an optical transmission loss of each center wavelength ($\lambda 1$ to $\lambda m$) for each channel after demultiplexing is a minimum. That is, even an optical signal demultiplexed for the same channel may have a different optical transmission loss depending on a degree of deviation from the center wavelength, and an error is caused in measurement of intensity of transmission light.

As shown in FIG. 25, when the wavelength of the optical signal is shifted from the center wavelength (for example, ±50 picometers), the transmission loss is changed as expressed by $\Delta P$, thereby reducing transmittance of the optical signal. $\lambda A$ shown in FIG. 25 represents an example of the wavelength of the optical signal input to a channel $\lambda m$. As such, a phenomenon in which even an optical signal demultiplexed for the same channel has a wavelength shifted from the center wavelength (hereinafter, "wavelength shift") can be caused. Furthermore, the optical transmission loss characteristic depends on temperature. Therefore, for example, an amount of wavelength shift $\Delta\lambda$ in the channel $\lambda m$ with respect to $\lambda A$ varies for each measurement. For this reason, a correction by, for example, setting an amount of error in advance is not applicable. In addition, the conventional optical monitoring device cannot monitor the wavelength of signal light.

SUMMARY OF THE INVENTION

It is an object of the present invention to solve at least the problems in the conventional technology.

An optical demultiplexing device according to one aspect of the present invention includes at least an input port, an wavelength demultiplexing means that splits input light beam input through the input port into its component colors, and a plurality of output port sets. Each of the output port sets includes at least two individual output ports, and the output port sets and the individual output ports are arranged so that a light beam component having a color is output through an output port set and the individual output ports in the output port set, and optical crosstalk between adjacent individual output ports belonging to a single output port set is lager than optical crosstalk between adjacent individual output ports one of which belonging to one of the output port sets and another of which belonging to another of the output port sets that is adjacent to the one.

An optical monitoring device according to another aspect of the present invention includes an optical demultiplexing unit that includes an input port; a first individual output port having a first transmission band of a predetermined optical transmission bandwidth and a first center wavelength; and at least one of a second individual output port having a second transmission band of a predetermined optical transmission bandwidth and a second center wavelength, the second transmission band partially overlapping the first transmission band, and that outputs, from the first individual output port and the second individual output port, a light having a predetermined wavelength input from the input port; and a signal processing unit that compensates wavelength dependency of an optical transmission loss of the optical demultiplexing unit using a correlational function calculated based on a relative light intensity ratio of a light output from the first individual output port and the second individual output port. The first/second center wavelength is substantially center wavelength of the first/second transmission band, and an optical transmission loss between the input port and the individual out put ports is a minimum.

An optical monitoring device according to still another aspect of the present invention includes an optical demultiplexing unit that includes an input port; a plurality of output port sets, each of which includes a first individual output port and at least one of a second individual output port, the first individual output port having a first transmission band of a predetermined optical transmission bandwidth and a first center wavelength, the second individual output port having a second transmission band of a predetermined optical transmission bandwidth and a second center wavelength, the second transmission band partially overlapping the first transmission band, and that outputs, from the first individual output port and the second individual output port, a light having a predetermined wavelength input from the input port; and a signal processing unit that calculates a wavelength difference between the first center wavelength and the wavelength of the light output through the individual output ports in a single output port set based on a relative light intensity ratio of a light output from the first individual output port and the second individual output port. The first/second center wavelength is substantially center wavelength of the first/second transmission band, and an optical transmission loss between the input port and the individual output ports is a minimum.

An optical monitoring device according to still another aspect of the present invention includes an optical demultiplexing unit that includes an input port; and a plurality of output port sets, each of which includes at least two individual output ports arranged to be adjacent to each other as a set, the output port set being set such that optical crosstalk between the individual output ports adjacent to each other in a single output port set is larger than optical crosstalk between adjacent individual output ports belonging to different output port sets, the optical demultiplexing unit splitting an input light beam input through the input port into its component colors and outputting light beams having different component colors from respective output port sets; an optical-electrical converting unit that performs optical-electrical conversion and detects powers of light output from the adjacent individual output ports in the respective output port sets; and a signal processing unit that compensates wavelength dependency of a light transmission loss between the input port and the individual output ports using a correlational function calculated based on a relative light intensity ratio of the powers of lights output from the individual output ports in a single output port set.

An optical monitoring device according to still another aspect of the present invention includes an optical demultiplexing unit that includes an input port; and a plurality of output port sets each of which includes at least two individual output ports arranged to be adjacent to each other as a set, the output port set being set such that optical crosstalk between the individual output ports adjacent to each other in a single output port set is larger than optical crosstalk between adjacent individual output ports belonging to different output port sets, the individual output port having a center wavelength, the optical demultiplexing unit splitting input light beam input through the input port into its component colors and outputting light beams having different component colors from respective output port sets, wherein an optical transmission loss between the input port and the individual output port is a minimum; an optical-electrical converting unit that performs optical-electrical conversion and detects powers of light output from the adjacent individual output ports in the respective output port sets; and a signal processing unit that calculates, based on the relative light intensity ratio of the light output from at least two adjacent individual output ports in a single output port set, a relative wavelength difference between the center wavelength of the individual output port in the optical demultiplexing unit and a wavelength of a light passing through the individual output port in a single output port set.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a schematic of an optical demultiplexing device according to a first embodiment of the present invention;

FIGS. 8A to 8C are graphs of a light intensity distribution of light confined by two waveguides and waveguide interval dependency of an overlapping state;

FIG. 12 is a schematic of an optical demultiplexing device according to a third embodiment of the present invention;

FIG. 15 is a schematic of an optical demultiplexing device according to a fourth embodiment of the present invention;

DETAILED DESCRIPTION OF THE PREFERRED EMBODIMENTS

With reference to the accompanying drawings, exemplary embodiments of the present invention will be described in detail below.

Figure 1:
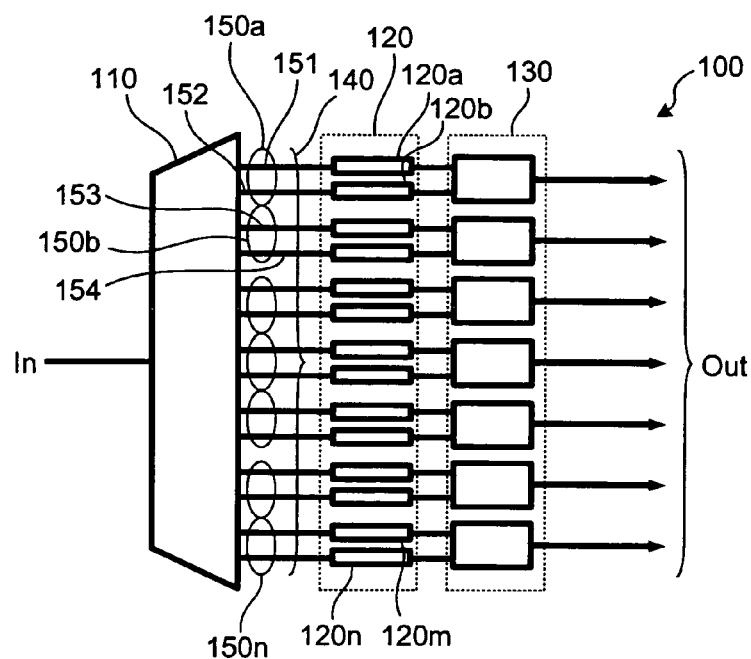
FIG. 1 is a schematic of an optical monitoring device according to embodiments of the present invention.

FIG. 1 is a schematic of an optical monitoring device according to embodiments of the present invention. An optical monitoring device 100 includes an optical demultiplexing device 110, an optical-electrical conversion unit 120 (120a to 120n), and a signal processing unit 130. WDM light input from an optical input port "In" of the optical monitoring device 100 is output from an output port "Out" as light-intensity information signals for respective wavelengths. The WDM light input is demultiplexed by the optical demultiplexing device 110 into lights each of which has a wavelength for each channel, exactly a color component corresponding to the optical wavelength assigned to the cannel, to be output to an output port unit 140. The output port unit 140 includes plural sets of output ports. Each of the sets includes two individual output ports, and to the ports in a single set, optical signals of identical channel, a light beam having a color component assigned to a cannel, are output.

Specifically, the output port unit 140 includes output port sets 150a to 150n each of which includes two individual output ports. For example, the output port set 150a includes a first individual output port 151 having a first transmission band and a second individual output port 152 having a second transmission band. The first individual output port 151 and the second individual output port 152 are set so that wavelengths of a transmission center at which transmittance of input light becomes maximum are different while transmission bands of output light partially overlap each other. It is preferable that the number of the output port set is equal to or more than the number of channels of light multiplexed.

The first individual output port 151 and the second individual output port 152 adjacent to each other in a single set among the output port sets 150a to 150n refer to as "intra-set adjacent ports". An optical leakage from one of the intra-set adjacent ports (for example, the first individual output port 151) to the other (for example, the second optical individual output port 152) and frequency of occurrence of such leakage refer to as "crosstalk between intra-set adjacent ports." The first individual output port 151 and the second individual output port 152 adjacent to each other but belonging to different output port sets among the output port sets 150a to 150n, for example, the second individual output port 152 of the output port set 150a and the first individual output port 153 of the output port set 150b, refer to as "inter-set adjacent ports". An optical leakage from one of the inter-set adjacent ports (for example, the second individual output port 152 of the output port set 150a) to the other (for example, the first individual output port 153 of the output port set 150b) and frequency of occurrence of such leakage refer to as "crosstalk between inter-set adjacent ports".

Figure 2:
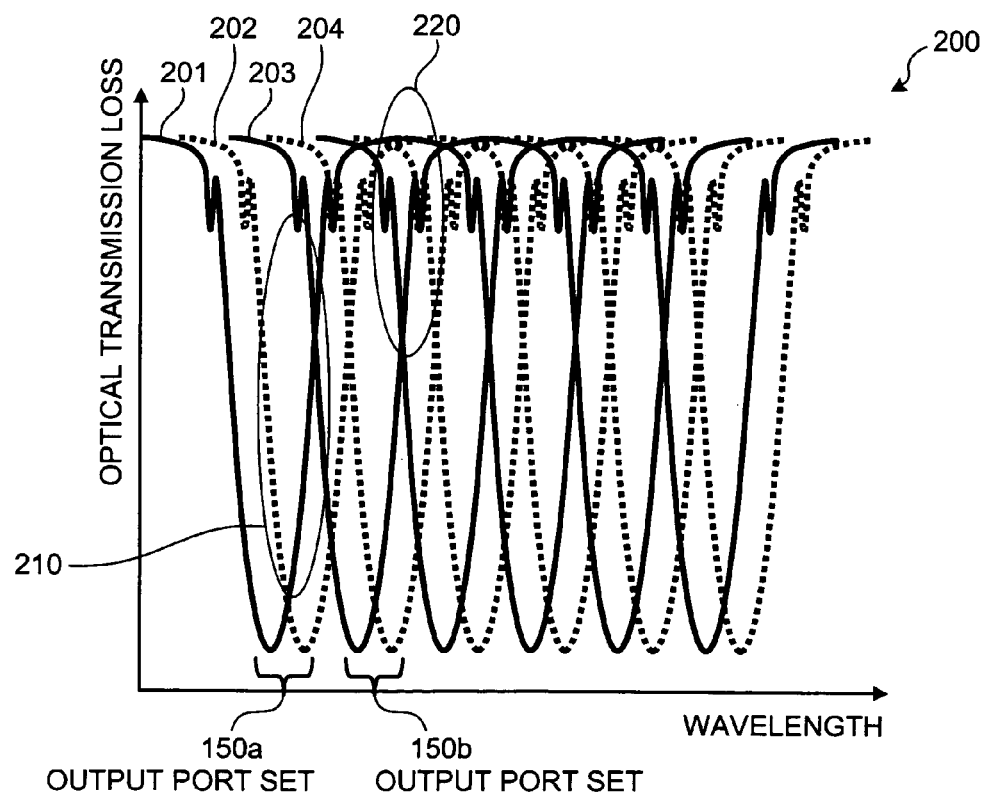
FIG. 2 is a graph of an optical transmission loss of an optical demultiplexing device according to the embodiments.

FIG. 2 is a graph of an optical transmission loss of an optical demultiplexing device according to the embodiments. In a graph 200 shown in FIG. 2, a horizontal axis represents a wavelength of light, and a vertical axis represents an optical transmission loss. In the graph 200, a spectrum 201 represents a transmission band of the first individual output port 151 of the output port set 150a and a spectrum 202 represents a transmission band of the second individual output port 152 of the output port set 150a. Similarly, a spectrum 203 represents a transmission band of the first individual output port 153 of the output port set 150b and a spectrum 204 represents a transmission band of the second individual output port 154 of the output port set 150b.

The optical demultiplexing device 110 (see FIG. 1) is configured such that the individual output ports in a single output port set, that is, the individual output ports that output optical signals of the same channel, have transmission bands overlapping with each other, such as the spectra 201 and 202; and the spectra 203 and 204. Specifically, as shown in FIG. 2, crosstalk 210 between the intra-set adjacent ports is set so as to be larger than crosstalk 220 between the inter-set adjacent ports.

Referring back to FIG. 1, in the optical monitoring device 100, the optical signals output to the output port unit 140 are then input to the optical-electrical conversion unit 120 provided near the output port unit 140. The optical signals input to the optical-electrical conversion unit 120 are converted into electrical signals according to the light intensity. The electrical signals output from the optical-electrical conversion unit 120 are input to the signal processing unit 130 provided at a stage subsequent to the optical-electrical conversion unit 120. Therefore, at the signal processing unit 130, information on a ratio (hereinafter, "light intensity ratio") of relative light intensities of light beams output from two adjacent individual output ports (151 and 152) in a single output port set can be obtained. Based on the information on the light intensity ratio, the signal processing unit 130 can perform a desired process, for example compensation of power detection error or measurement of the wavelength.

Figure 3:
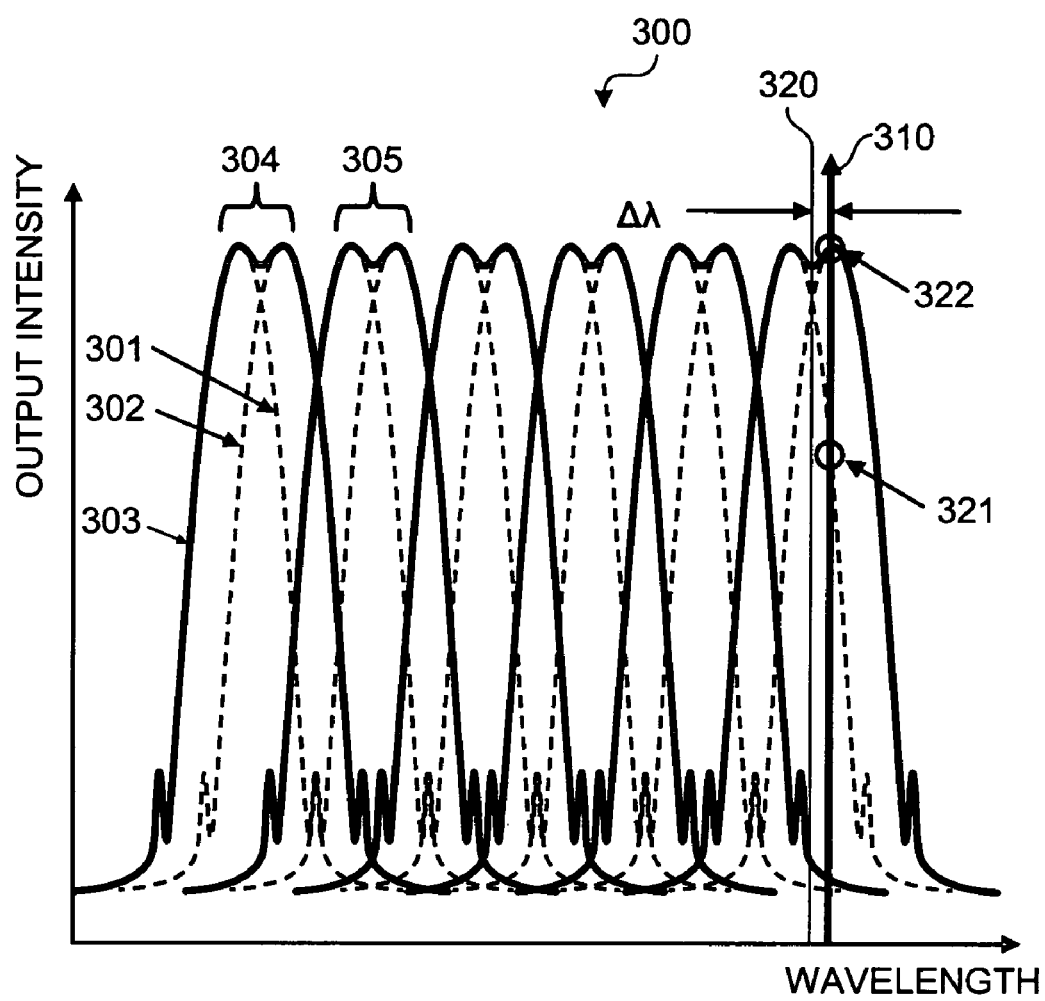
FIG. 3 is a graph of wavelength dependency of an output of an optical-electrical conversion unit in the optical demultiplexing device.

FIG. 3 is a graph of wavelength dependency of an output of an optical-electrical conversion unit in the optical demultiplexing device. In a graph 300 shown in FIG. 3, a horizontal axis represents a wavelength of the optical signal input to the optical-electrical conversion unit 120, and a vertical axis represents output intensity when the optical signal is output from the optical-electrical conversion unit 120 as an electrical signal. A spectrum 301 represents wavelength dependency of the electrical signal output from the optical-electrical conversion unit 120a, and a spectrum 302 represents wavelength dependency of the electrical signal output from the optical-electrical conversion unit 120b. A spectrum 303 represents a sum of the spectrum 301 and the spectrum 302. The sum of such two adjacent spectra (for example, spectra 304 and 305) represents wavelength dependency of electrical signals output from the optical-electrical converting units forming one set of the output port sets (for example, the optical-electrical converting units 120a and 120b).

For example, when light to be measured 310 having a wavelength λ is input to the optical-electrical converting units 120m and 120n of the corresponding channel and is then output to as electrical signals, the center wavelength of that channel is a wavelength expressed by a straight line 320. At this time, the electrical signal output from the optical-electrical conversion unit 120m has an output intensity 321, and the electrical signal output from the optical-electrical conversion unit 120n has an output intensity 322. From the output intensities 321 and 322, the light intensity ratio can be acquired. Furthermore, from the light intensity ratio, a relative wavelength shift Δλ between the straight line 320 representing the transmission center wavelength and the light to be measured 310 can be measured.

Figure 4:
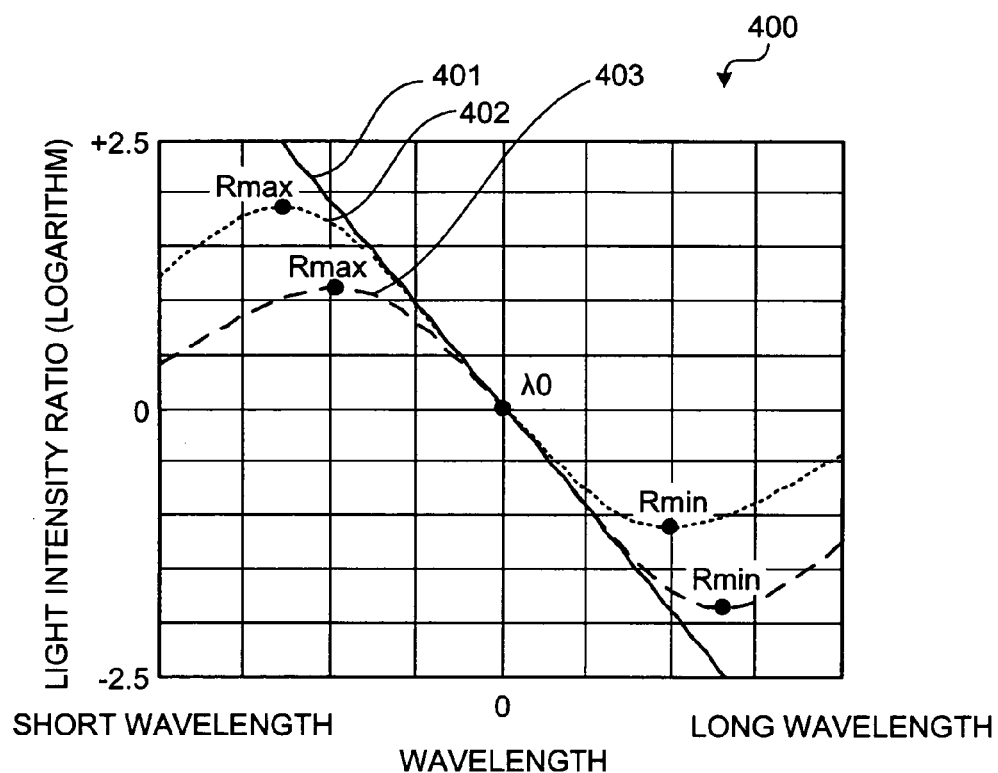
FIG. 4 is a graph of wavelength dependency of a light intensity ratio.

FIG. 4 is a graph of wavelength dependency of the light intensity ratio. In a graph 400 shown in FIG. 4, a horizontal axis represents a wavelength by taking the center waveguide λ0 of each channel as 0, and a vertical axis represents a light intensity ratio (logarithm plot with base number=10). A waveform 401 represents a wavelength dependency of the light intensity ratio when each port in the optical demultiplexing device 110 does not have crosstalk, the crosstalk from other output port set, at all. Waveforms 402 and 403 each represent a wavelength dependency of the light intensity ratio when each output port set in the optical demultiplexing device 110 has crosstalk and a light go through an output port set is leaked to another output port set. The waveform 403 represents a wavelength dependency of the light intensity ratio when the crosstalk is larger than that of the waveform 402. In proportion to an amount of crosstalk, the light intensity is decreased at the short wavelength side after a maximum value Rmax, while the light intensity is increased at the long wavelength side after a minimum value Rmin.

From FIG. 4, when no crosstalk is present in the optical demultiplexing device 110 (in a case of the wavelength 401), a wavelength shift can be uniquely determined from the light intensity ratio within a wavelength range in which the output of the optical-electrical conversion unit 120 can be distinguished from noise. When crosstalk is present in the optical demultiplexing device 110 (in a case of the waveforms 402 and 403), a wavelength shift can be uniquely determined from the light intensity ratio within a wavelength range in which the output of the optical-electrical converting unit can be distinguished from noise and a wavelength range in which the light intensity ratio in a wavelength band in each channel has the maximum value Rmax and the minimum value Rmin, that is, a wavelength ratio between the maximum value Rmax and the minimum value Rmin.

A wavelength difference between a wavelength with a minimum light intensity ratio and a wavelength with a light intensity ratio being 1 (hereinafter, "center wavelength of an output port unit") at the center wavelength λ0 is substantially equal to a wavelength difference between the wavelength with a minimum light intensity at the minimum value Rmin and the center wavelength λ0 of the output port set 150 (any one of the output port sets 150a to 150n). Therefore, in a wavelength with the intensity of light output from the second individual output port 152 being a minimum with respect to the intensity of light output from the first individual output port 151, the intensity of light output from the first individual output port 151 is maximum with respect to the intensity of light output from the second individual output port 152.

Furthermore, even if the light output from the first individual output port 151 or the second individual output port 152 is attenuated due to a loss in the optical demultiplexing device 110 by using wavelength-shift information, an accurate light intensity can be measured and monitored by compensating and correcting the amount of attenuation even if a wavelength shift occurs. Also, an arithmetic operation is performed by summing an output of an electrical signal output from the optical-electrical conversion unit 120 after light passing through the first individual output port 151 is input to the optical-electrical conversion unit 120 and an electrical signal output from the optical-electrical conversion unit 120 after light passing through the second individual output port 152 is input to the optical-electrical conversion unit 120 and then, for the sum of the outputs of these electrical signals, canceling wavelength dependency of the transmission loss of the optical demultiplexing device 110. Thus, even when a wavelength shift occurs, a more accurate light intensity can be measured and monitored.

Figure 5:
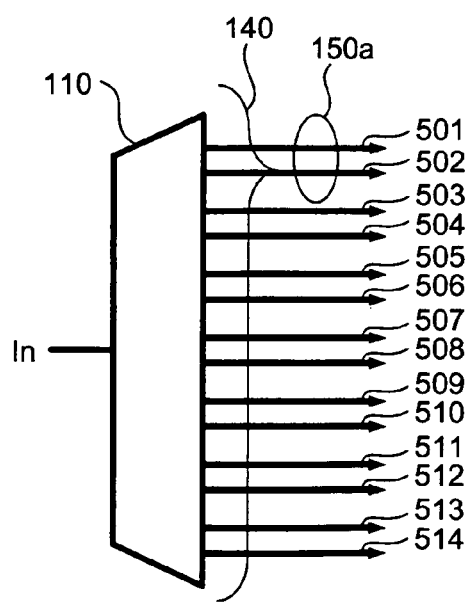
FIG. 5 is a schematic of the optical demultiplexing device.

FIG. 5 is schematic of the optical demultiplexing device. As shown, the optical demultiplexing device 110 outputs WDM light input from the optical input port "In" to the output port unit 140. The output port unit 140 includes ports 501 to 514, and these ports 501 to 514 form output port sets that include two adjacent ports as a set. For example, the ports 501 and 502 form the output port set 150a. With the optical demultiplexing device 110 configured as described above, an output characteristic of each port is represented by a spectrum as shown in FIG. 2. Thus, a relative intensity of light beams output from two individual output ports in each output port set, that is, the "light intensity ratio", can be monitored. Also, based on the information on the light intensity ratio, a wavelength shift can be monitored.

FIG. 6 is schematic of an optical demultiplexing device according to a first embodiment of the present invention. As shown, an optical demultiplexing device 600 is formed on a waveguide-equipped substrate 601 with an input port pattern (input waveguide) 602, an input slab pattern (input slab) 603, a phase-difference forming unit pattern (channel waveguide) 604, an output slab pattern 605, and an output port pattern (output waveguide) 606. The output port pattern 606 includes output port sets 610 to 670 each of which includes two individual output port patterns.

Figure 7A:
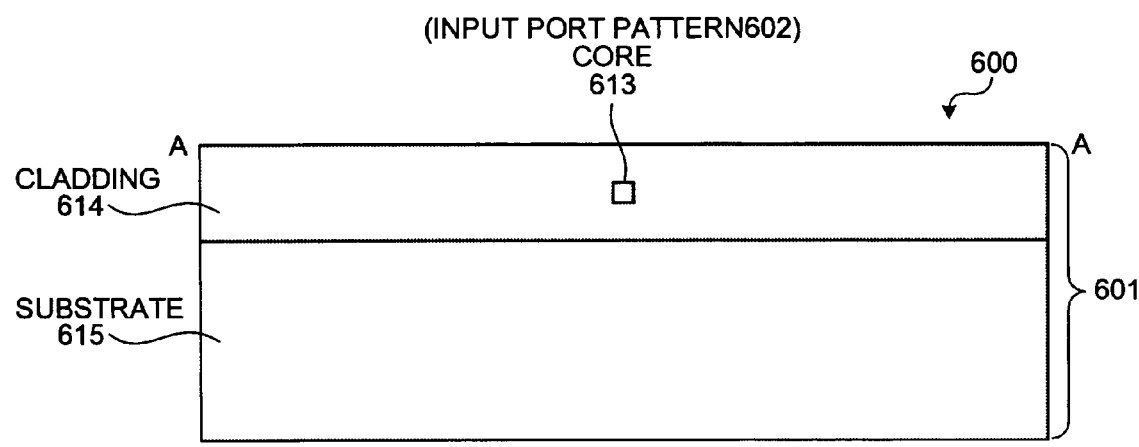
FIG. 7A is a cross-section of the optical demultiplexing device taken along a line A—A shown in FIG. 6.

The input port pattern, input slab pattern, phase-difference forming unit pattern, output slab pattern and output port pattern are formed of core material with high reflective index and these patterns are surrounded by clad material with reflective index lower than that of the core as shown in FIG. 7A. Cross-sections of the core patterns are exposed at the end of input port pattern opposite to the input slab pattern and the end of output port pattern opposite to the output slab pattern, and the light is input and output through the cross-sections. The input slab pattern and output slab pattern are shaped wide and a light beam input from the input port pattern propagates in the input slab pattern not to laterally be confined and becomes divergent laterally. On arriving one end of phase-difference forming unit pattern the light beam is coupled into the phase-difference forming unit pattern and propagates through the individual waveguide to another end of the phase-difference forming unit pattern. A length of the phase-difference forming unit pattern is chosen such that difference in optical path length between adjacent waveguides equals to an integer multiple for the center wavelength of the demultiplexer. Light beams output from the phase-difference forming unit pattern are interfered and diffracted in the output slab pattern and then the light beams output from the phase-difference forming unit pattern are deflect to different angles corresponding to their color component. And each of the light beams having each color component is coupled to each of the output port patterns formed at a place at which each of the light beams arrives. A principal structure, basic operation, and design technique are described in "IEEE Journal of Selected Topics in Quantum Electronics", volume 2, number 2, June, 1996 pp. 236–250 by Smit, M. K. and Van Dam, C.

An interval between core patterns that forms individual output ports in the output port unit at a portion at which the output port pattern 606 is connected to the output slab pattern 605 refers to as an interval of the output waveguide. Such as the interval between output patterns 611 and 612, and an interval between output patterns 621 and 622, refers to as a "first waveguide interval". An interval between core patterns forming adjacent output port units, such as an interval between the output patterns 612 and 621; and an interval between output patterns 622 and 631, refers to as a "second waveguide interval". The first waveguide interval is smaller than the second waveguide interval.

Figure 7B:
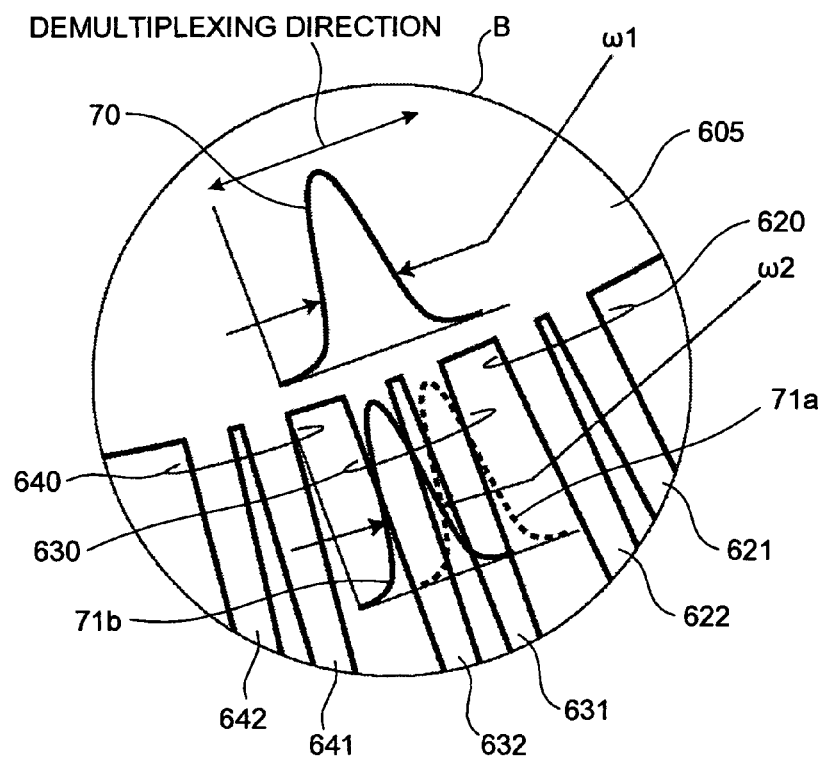
FIG. 7B is an enlarged view of a range B in the optical demultiplexing device shown in FIG. 6.

FIG. 7A is a cross-section of the optical demultiplexing device taken along a line A—A shown in FIG. 6. FIG. 7B is an enlarged view of a range B of the optical demultiplexing device shown in FIG. 6. As shown in FIG. 7A, the waveguide-equipped substrate 601 includes a structure with a substrate 615 and a cladding 614 that are laminated together. As the substrate 615, inorganic materials, such as quarts and silicon, or organic materials, such as polyimide, are used. The cladding 614 encloses a core 613 serving as a waveguide. The cladding 614 and the core 613 are made of a dielectric material, such as quartz, silica, polyimide-group (polyimide) resin, epoxy-group (epoxy) resin, acrylic-group (acrylate) resin, and a transparent material such as a silicone-group material (silicone). Of these materials, a material having a low relative refraction index is used for the cladding 614, and a material having a high relative refraction index is used for the core 613. The input port pattern 602, the phase-difference forming unit pattern 604, and the output port pattern 606 shown in FIG. 6 can be formed by successively arranging the core 613 enclosed by the cladding 614 on the substrate 615.

As shown FIG. 7B, the waveguide interval between output ports forming output port sets 620 (interval between the output patterns 621 and 622), 630 (interval between the output pattern 631 and an output pattern 632), and 640 (interval between output patterns 641 and 642, which are the first waveguide interval) is shorter than the waveguide interval between adjacent output ports each of which belongs to different output port units (for example, the intervals between output patterns 622 and 631, output patterns 632 and 641, and etc., which are the second waveguide interval).

A waveform 70 represents an electric field intensity distribution of the optical signal input to channels of the output port set 630 including output ports 631 and 632, and is mode width, it is defined the full width of the waveform at the intensity of 1/e (e is the base of natural logarithms), of the optical signal. Upon input to the output port set 630, the optical signal is output to each output port in the output port set 630 with the waveform 70 being demultiplexed in a demultiplexing direction shown in FIG. 7B. Upon input to the output port set 630, an optical signal represented by a waveform 71a obtained by demultiplexing the optical signal of the waveform 70 is output to the individual output port 631, and an optical signal represented by a waveform 71b obtained by demultiplexing the optical signal of the waveform 70 is output to the individual output port 632. For each of the optical signals obtained by demultiplexing the output signal of the waveform 70, ω2 is a mode width of the waveform 71b.

Figure 8A:
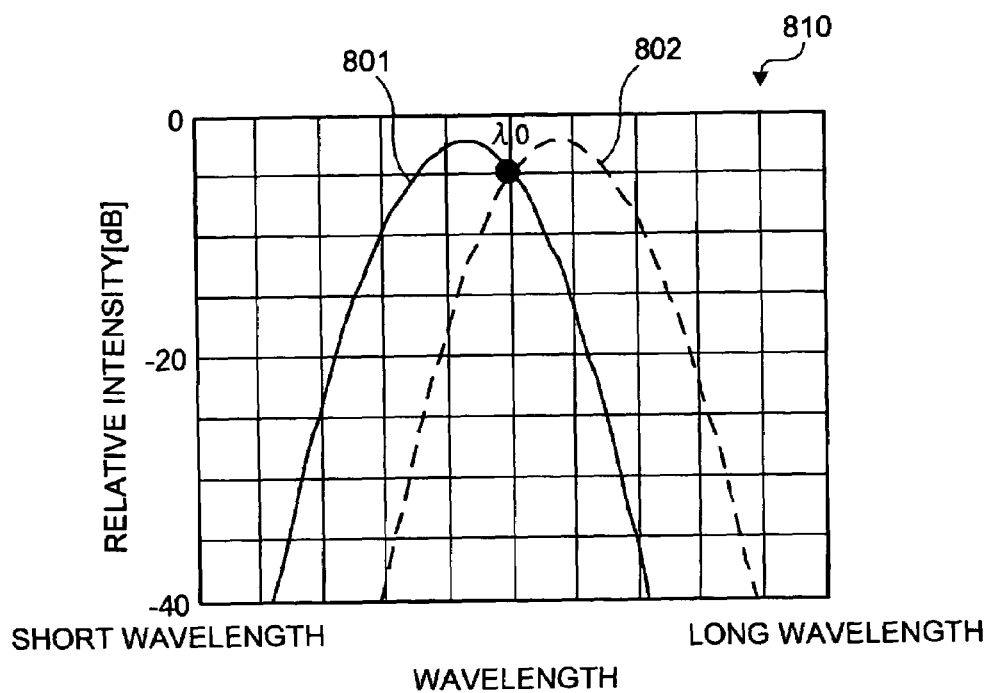
Figure 8B:
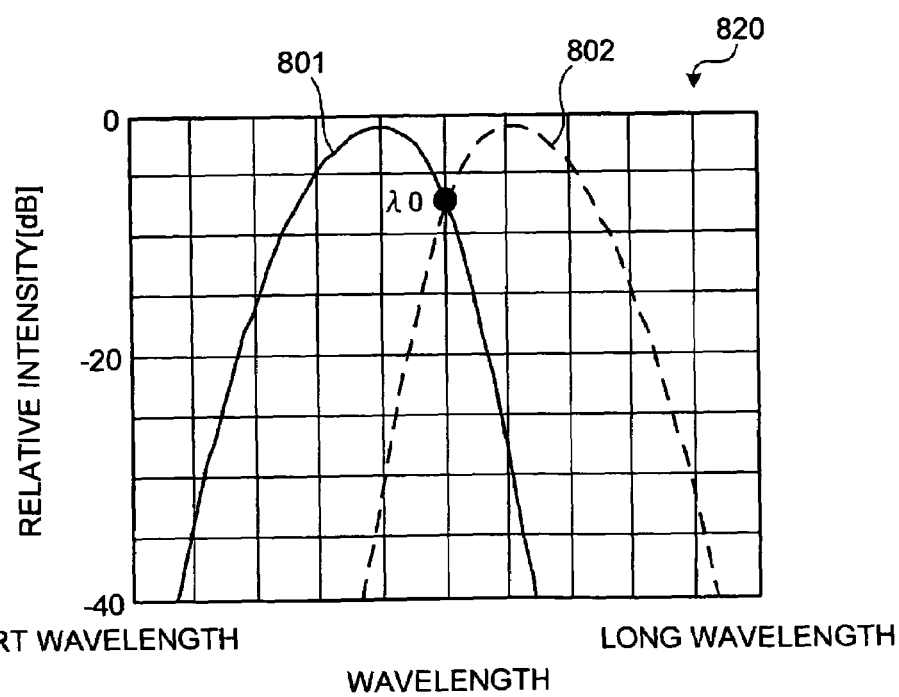

FIGS. 8A to 8C are graphs of a light intensity distribution of light confined by two waveguides and waveguide interval dependency of an overlapping state. In FIGS. 8A to 8C, a horizontal axis represents a wavelength with the center wavelength λ0 of a channel being taken as a center, and a vertical axis represents a relative intensity (decibel (dB)) of an optical signal. A waveform 801 represents an output from the first individual output port 151, and a waveform 802 represents an output from the second individual output port 152. In graphs 810 to 830, a setting of the first waveguide interval is different from one another. Waveforms shown in the graph 810 are obtained when the first waveguide interval is set to be the largest. Waveforms shown in the graph 830 are obtained when the first waveguide interval is set to be the smallest. Waveforms shown in a graph 820 are obtained when the first waveguide interval is set to be in intermediate between the first waveguide intervals of cases shown in the graphs 810 and 830.

As shown, if the first waveguide interval is too large, the relative intensity at the center wavelength λ0 of the channel is decreased. If the relative intensity at the center wavelength λ0 is too low, the intensity of the optical signal is decreased to cause the optical signal to be buried in a background occurring due to accumulation of crosstalk from optical signals of other channels, thereby making it impossible to recognizing the optical signal as a signal. Conversely, if the first waveguide interval is too short, the transmission wavelength band of the channel becomes narrow, thereby making it impossible to allow an optical signal with a wavelength shift from the center wavelength λ0 during transmission to pass. For this reason, the setting that realizes a condition shown in the graph 820 in FIG. 8B is the most preferable.

Figure 9:
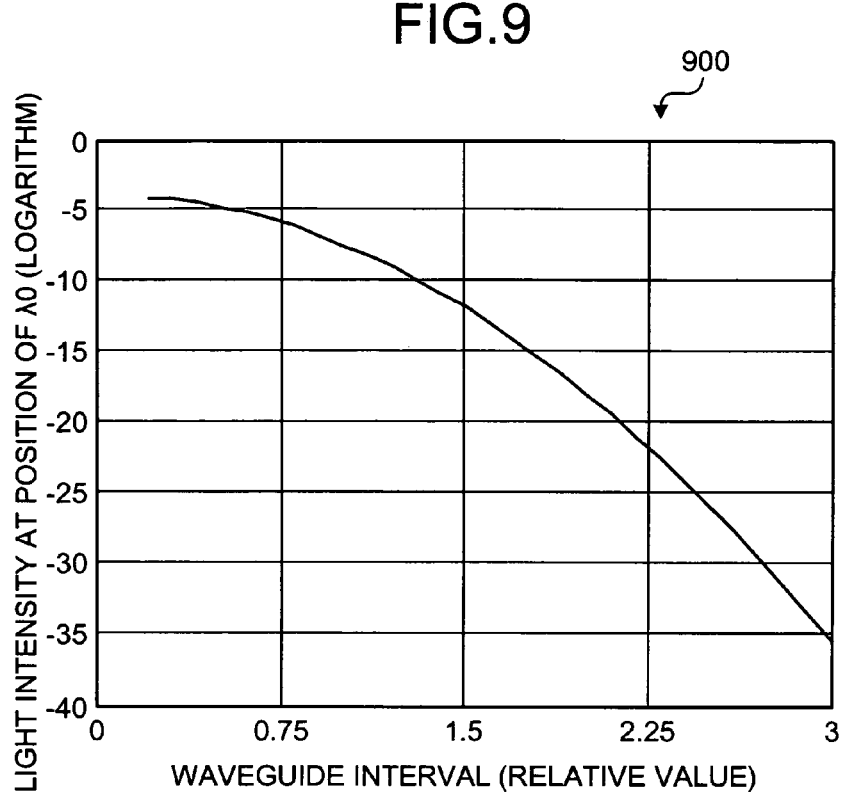
FIG. 9 is a graph of waveguide interval dependency of the light intensity of light output from a port at λ0 shown in FIGS. 8A to 8C.

FIG. 9 is a graph of waveguide interval dependency of the light intensity of light output from a port at λ0 shown in FIGS. 8A to 8C. In a graph 900, a horizontal axis represents a waveguide interval (relative value), that is, an interval between individual output ports, and a vertical axis represents a light intensity at the center waveguide λ0 (logarithm plotting of relative values). Generally, the crosstalk between two waveguides can be considered to be larger as the light intensity of the optical signal output from any of the ports at the center waveguide λ0 shown in FIGS. 8A to 8C is larger.

In other words, the smaller the waveguide configuration interval is, the larger the light intensity of the optical signal at the center wavelength λ0 becomes. Specifically, as the configuration interval between individual output ports shown in FIG. 6 is narrower, the crosstalk to the adjacent individual output port is larger. Therefore, as shown in FIG. 7B, the interval between adjacent individual output ports in the same output port set (the first waveguide interval) is smaller than the interval between adjacent individual output ports of different output port sets (the second waveguide interval), thereby making optical crosstalk between adjacent individual output ports in the same output port set relatively large.

Figure 10:
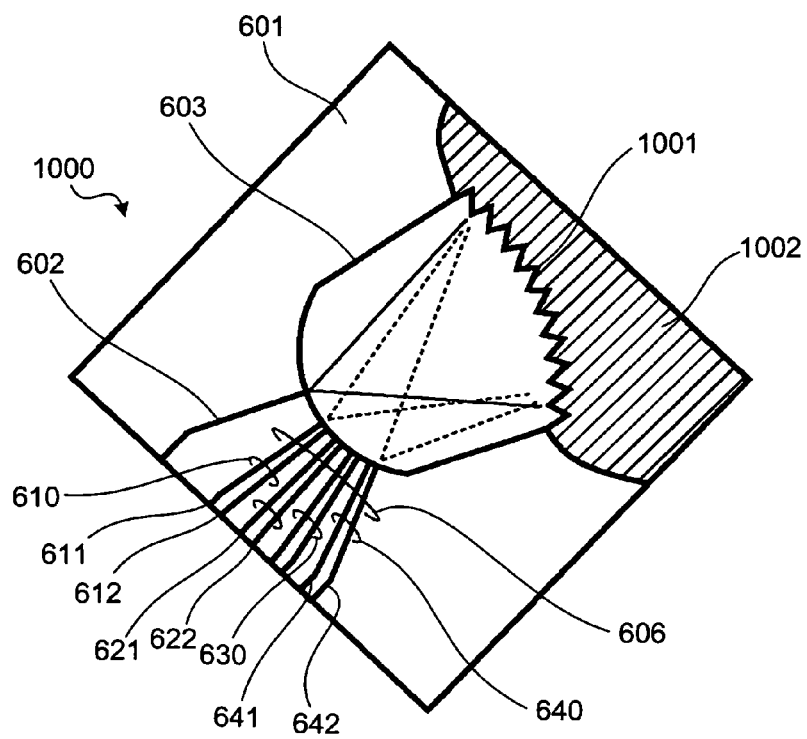
FIG. 10 is a schematic of an optical demultiplexing device according to a second embodiment of the present invention.

FIG. 10 is a schematic of an optical demultiplexing device according to a second embodiment of the present invention. An optical demultiplexing device 1000 is formed on the waveguide-equipped substrate 601 with the input port pattern (input waveguide) 602, the input slab pattern (input slab) 603, an echelette grating (one example of a diffraction grating) 1001, and the output port pattern (output waveguide) 606. Similarly to the first embodiment, the waveguide-equipped substrate 601 has a structure in which a waveguide formed of the core 613 is enclosed by the cladding 614. Although the optical demultiplexing device 1000 is connected to the optical-electrical conversion unit 120 and the signal processing unit 130, these components are omitted in the drawing.

Also in the optical demultiplexing device 1000, an interval between individual output ports in each one of the output port sets 610 to 640 at a portion at which the output port pattern 606 is connected to the input slab pattern 603 (an interval in the output waveguide) refers to as the first waveguide interval, and an interval between adjacent individual output ports belonging to different output port sets refers to as the second waveguide interval. The first waveguide interval is shorter than the second waveguide interval, thereby making optical crosstalk between adjacent individual output ports in a single output port set relatively large.

WDM light input from the input port pattern 602 freely propagates through the input slab pattern 603. Upon reflection on the echelette grating 1001, the WDM light is demultiplexed into optical signals having respective wavelengths. These optical signals are diffracted in different directions, and are then converged for each channel. The optical signals converged are coupled to the output port pattern 606 and are then output to a corresponding one of the individual output ports 611 to 642.

The echelette grating 1001 is formed by processing the input slab pattern 603 in such a manner that a boundary of the input slab pattern 603 has a sawtooth shape. If a hatched portion 1002 in the cladding 614 is removed to be form an air space, a light reflectivity of the grating surface of the echelette grating 1001 can be increased. Furthermore, if a high reflective coat of a single-layered or multilayered dielectric thin film is formed on the grating surface of the echelette grating 1001, the light reflectivity is further increased, thereby decreasing an optical loss.

Figure 11A:
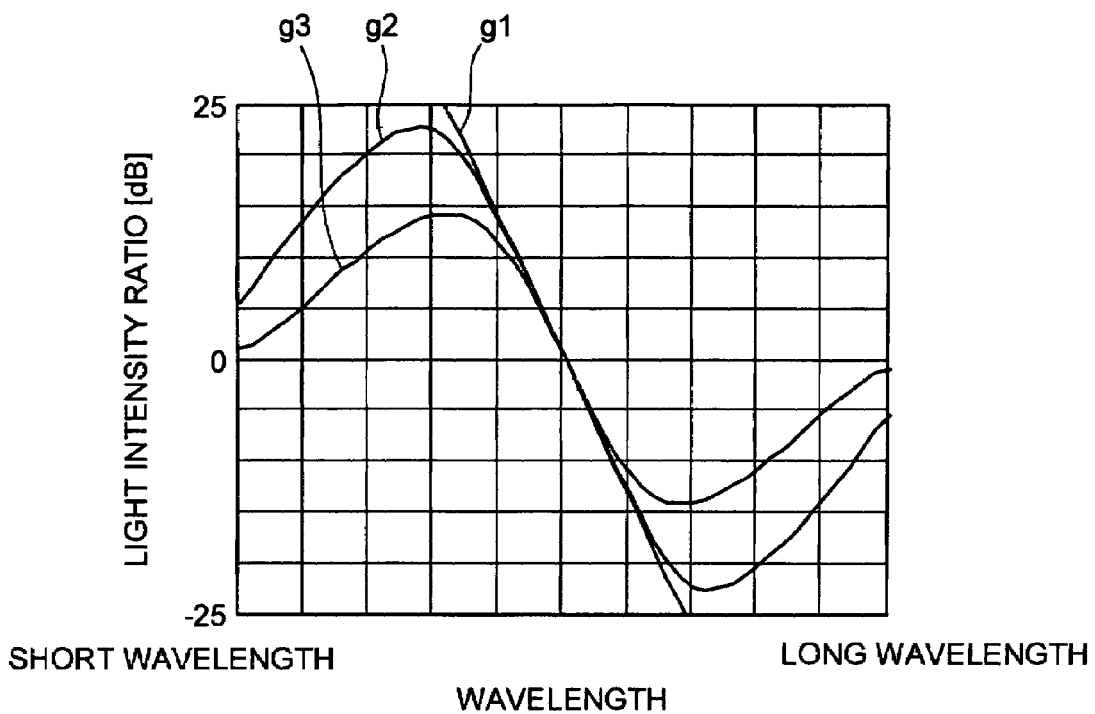
FIGS. 11A to 11C are graphs of wavelength dependency of a light intensity ratio.
Figure 11B:
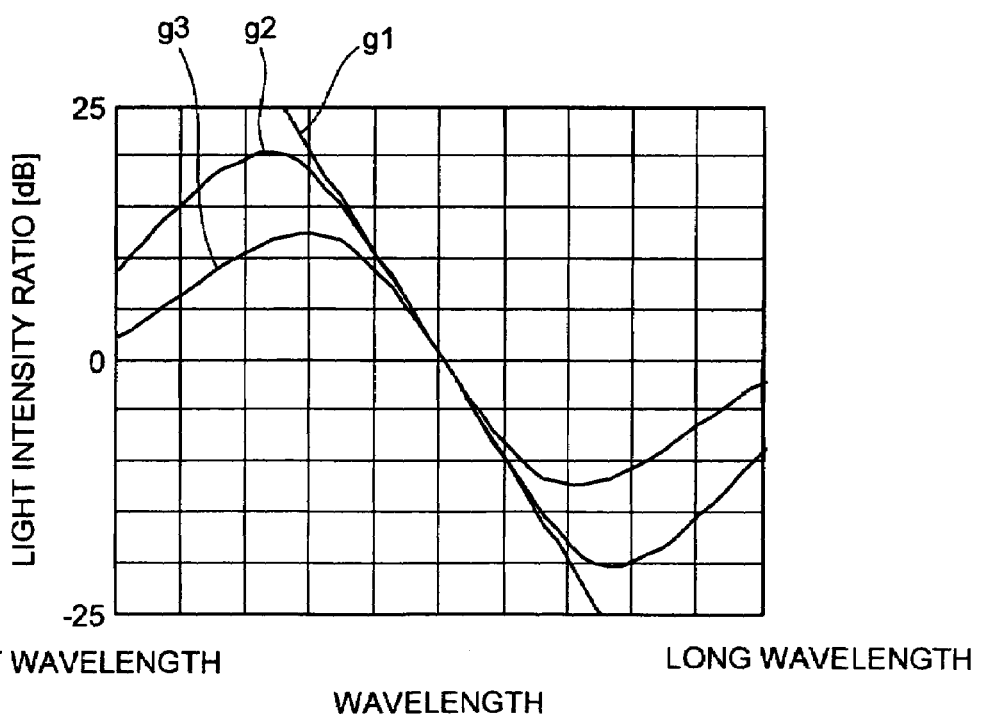
Figure 11C:
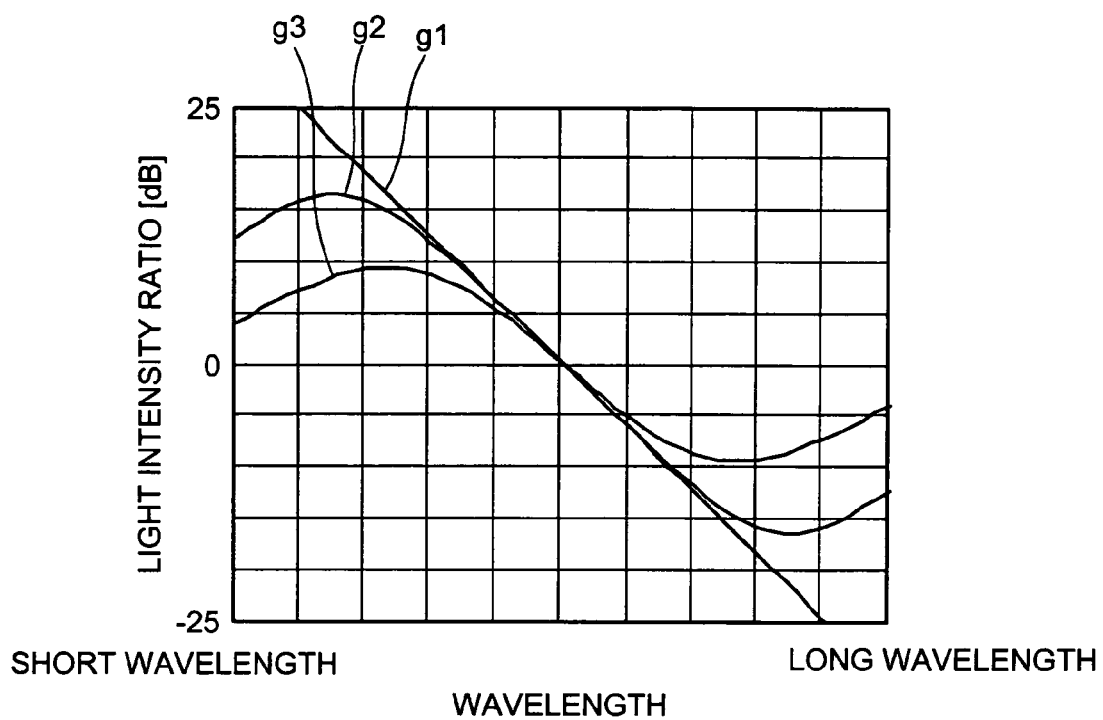

FIGS. 11A to 11C are graphs of wavelength dependency of a light intensity ratio. In each graph, a horizontal axis represents a wavelength with the center waveguide λ0 of a channel being taken as a center, and a vertical axis represents a relative light intensity ratio (dB) of an optical signal. When light is input to the input port pattern 602 of the optical demultiplexing device 1000 shown in FIG. 10, a wavelength shift having a width of a wavelength of an optical signal for each channel occurs. An entire wavelength shift width at a portion at which the input port pattern 602 is connected to the input slab pattern 603 refers to as an input mode width. Moreover, for the optical signals output from the output port pattern 606, an entire wavelength shift width at a portion at which the input port pattern 602 is connected to the output slab pattern 605 (in the optical demultiplexing device 1000, the input slab pattern 603 also serves as an output slab pattern) refers to as an output mode width.

FIGS. 11A to 11C are graphs of wavelength dependency of a intensity ratio of light beams output from two ports when the input mode width is changed with the output mode width being constant. In other words, the graphs shown in FIGS. 11A to 11C represent a "light intensity ratio". FIG. 11A depicts a case in which the input mode width is smaller than the output mode width. FIG. 11B depicts a case in which the input mode width and the output mode width are large. FIG. 11C depicts a case in which the input mode width is larger than the output mode width.

In each of the graphs in FIGS. 11A to 11C, g1 represents a wavelength dependency of the relative intensity ratio of the light beams when no crosstalk is present in each port in the optical demultiplexing device 1000 or when only one wavelength channel is used. g2 and g3 each represent a wavelength dependency when crosstalk is present in the optical demultiplexing device 1000. Compared to g2, g3 has a larger total intensity of unwanted emission light leaked by crosstalk. The intensity of the unwanted emission light leaked by unwanted emission is larger as the crosstalk in the optical demultiplexing device 1000 is larger or as the number of wavelength (WDM) channels input to the optical demultiplexing device 1000 is larger.

In the optical monitoring device according to the embodiments of the present invention, a wavelength range in which a wavelength shift can be found from the light intensity ratio in one channel is limited to a wavelength range in which a light intensity ratio has a one-to-one correspondence with a wavelength shift, that is, a portion at which a linear characteristic is observed in each graph. Such a wavelength range where a light intensity ratio has a one-to-one correspondence with a wavelength shift refers to as a "correctable bandwidth". In the cases shown in FIGS. 11A to 11C, a range between a wavelength with a maximum light intensity ratio and a wavelength with a minimum light intensity ratio is a maximum correctable bandwidth.

As evident from FIGS. 11A to 11C, the larger the input mode width is, the larger the correctable bandwidth is. Therefore, the correctable bandwidth can be increased by making the input mode width larger. Even when the wavelength of a light source used in transmission of a WDM signal is greatly changed, intensity correction and waveform monitoring can be performed.

FIG. 12 is a schematic of an optical demultiplexing device according to a third embodiment of the present invention. An optical demultiplexing device 1200 is formed on the waveguide-equipped substrate 601 with the input port pattern (input waveguide) 602, the input slab pattern (input slab) 603, the phase-difference forming unit pattern (channel waveguide) 604, the output slab pattern 605, and the output port pattern (output waveguide) 606. The optical demultiplexing device 1200 is connected to the optical-electrical conversion unit 120 and the signal processing unit 130. Furthermore, similarly to other embodiments, in the optical demultiplexing device 1200, the waveguide-equipped substrate 601 has a structure in which a waveguide formed of the core 613 is enclosed by the cladding 614. A cross-section of the waveguide-equipped substrate 601 has a structure as shown in FIG. 7A.

In the optical demultiplexing device 1200, WDM light input to the input port pattern 602 is diffracted by the input slab pattern 603 in a direction parallel to the waveguide-equipped substrate 601 for each wavelength for free propagation. The input port pattern 602 is provided with a taper portion 2T at a portion connecting to the input slab pattern 603 so that the pattern width gradually becomes wider as being close to the input slab pattern 603. The thickness of the core 613 forming the input slab pattern 603 (see FIG. 7A) is equal to the thickness of the core 613 forming other patterns. Therefore, the waveguide is confined in a direction perpendicular to the waveguide-equipped substrate 601.

A boundary 32 at a side of outputting optical signals from the input slab pattern 603 is formed so as to have a shape of an arc of a circle having a radius centering on a point 31 connected to the input port pattern 602. To the boundary 32, the phase-difference forming unit pattern 604 including a plurality of cores 613 is connected. The optical signals propagating through the input slab pattern 603 are coupled to the phase-difference forming unit pattern 604. The phase-difference forming unit pattern 604 is connected to the output slab pattern 605 having a shape approximately identical to the input slab pattern 603 as being folded along a line C—C.

Each core 613 forming the phase-difference forming unit pattern 604 is formed so that a difference in effective optical path length from the input slab pattern 603 to the output slab pattern 605 between adjacent patterns is constant. When a diffraction order is represented by m, the difference in effective optical path length between adjacent patterns of the phase-difference forming unit pattern 604 is m times larger than the center wavelength λ0 of the optical signal demultiplexed in the optical demultiplexing device 1200. Usually, a value from 20 to 30 is used for m.

A boundary 54 at a side of outputting optical signals from the output slab pattern 605 has a shape of an arc of a Rowland circle, which is a circle having a half of the radius of a circle forming an arc 52. The Rowland circle is formed so as to abut on the arc 52 and the center of the circle forming the arc 52. A point 53 represents a center position of the Rowland circle formed in the manner as described above.

The optical signals output from the phase-difference forming unit pattern 604 propagate through the output slab pattern 605 so as to be intensified for each specific wavelength, and are then coupled to the output port pattern 606. The output port pattern 606 is provided with a taper portion 6T of which a width gradually becomes wider as being close to the output slab pattern 605. The output port pattern 606 includes the individual output ports 611 to 632 to form the output port sets 610 to 630. While three output port sets are formed in a case shown in FIG. 12, the output port sets are formed as many as the number of channels to be monitored or more.

Also in the third embodiment, an interval between adjacent individual output ports (strictly speaking, an interval between centers of the cores 613 at a portion where the cores 613 of the waveguide forming the output port pattern 606 are connected to the output slab pattern 605) in each of the output port sets 610 to 630 is defined as a first waveguide interval. An interval between adjacent individual output ports (strictly speaking, an interval between centers of the cores 613 at a portion where the cores 613 of the waveguide forming the output port pattern 606 are connected to the output slab pattern 605) of adjacent output port sets is defined as a second waveguide interval. The first waveguide interval is set so as to be smaller than the second waveguide interval.

When a width of the core 613 at a portion at which the input port pattern 602 is connected to the input slab pattern 603 refers to as an "input waveguide end width" and a width of a portion at which the pattern of the core 613 forming the output port pattern 606 is connected to the output slab pattern 605 is referred to as an "output waveguide starting-point width", the input waveguide end width is set so as to be larger than the output waveguide starting-point width. Among the optical signals of the respective channels of the WDM light having a normal wavelength shift input to the input port pattern 602, an entire width of a wavelength shift of an optical signal at the portion where the input port pattern 602 is connected to the input slab pattern 603 is defined as an input mode width. Also, among the optical signals of the respective channels having a normal wavelength shift output to the output port pattern 606, an entire width of a wavelength shift of an optical signal at the portion where the output port pattern 606 is connected to the output slab pattern 605 is defined as an output mode width. When the input waveguide end width is larger than the output waveguide starting-point width, the input mode width is larger than the output mode width.

Similarly to other embodiments, regarding the optical-electrical conversion unit 120 and the signal processing unit 130 according to the third embodiment, an output from the optical demultiplexing device 1200 passes through the optical-electrical conversion unit 120 and is then processed by the signal processing unit 130. Thus, wavelength dependency of insertion loss in the optical demultiplexing device 1200 can be corrected, thereby achieving light intensity measurement with more accuracy.

Figure 13:
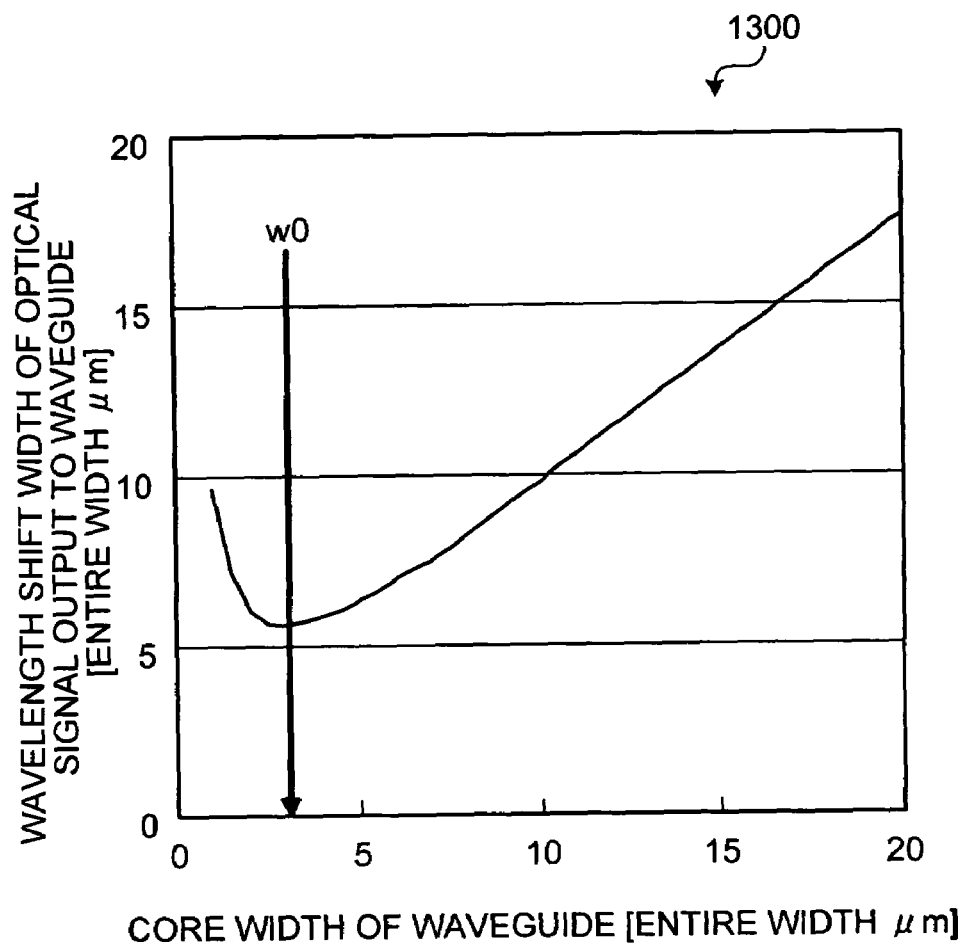
FIG. 13 is a graph of a relation between a width of a core of an optical waveguide and a width of a wavelength shift of an optical signal output to the waveguide.
Figure 14A:
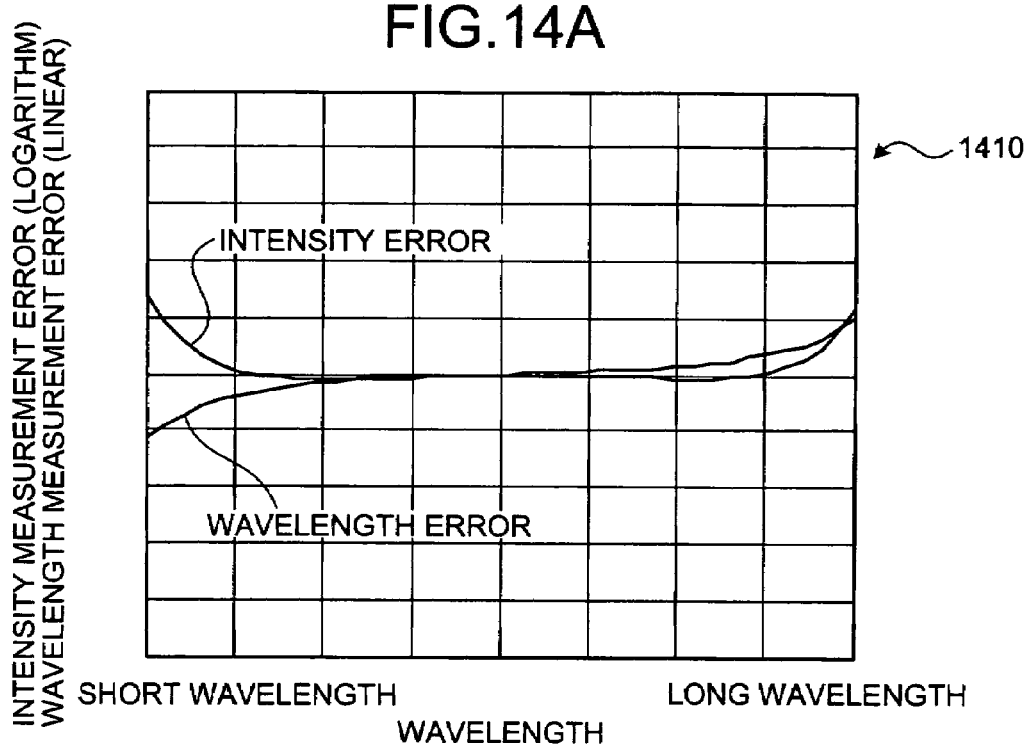
FIGS. 14A to 14D are graphs of measurement errors in light intensity and wavelength shift when a ratio of the waveguide interval and an output mode width are changed.
Figure 14B:
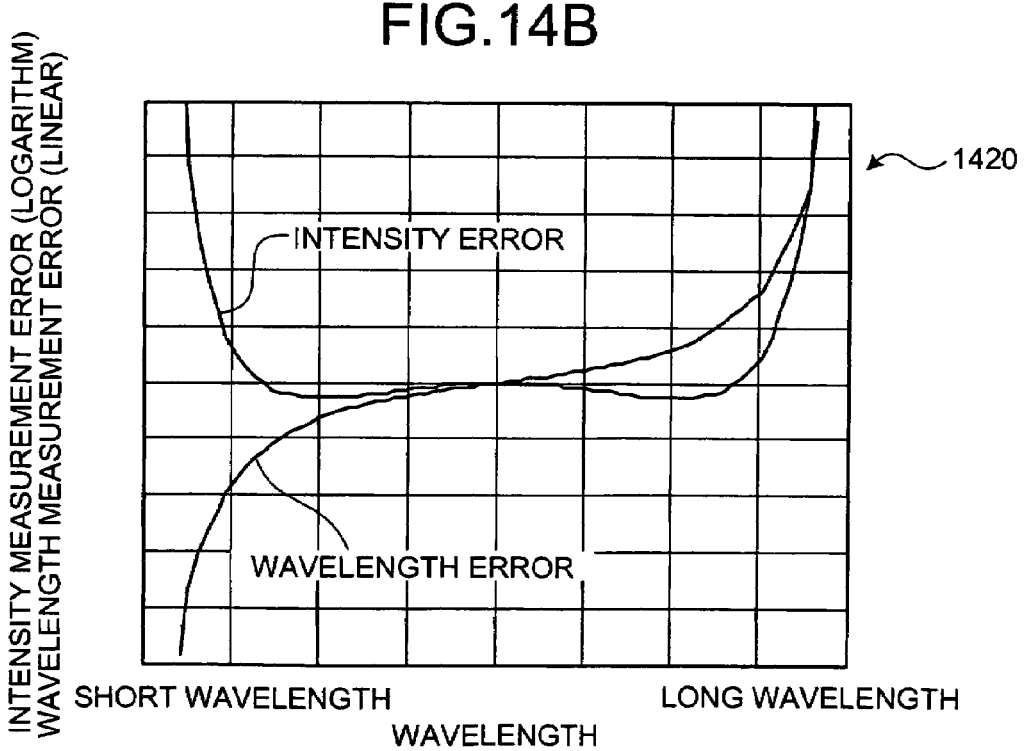
Figure 14C:
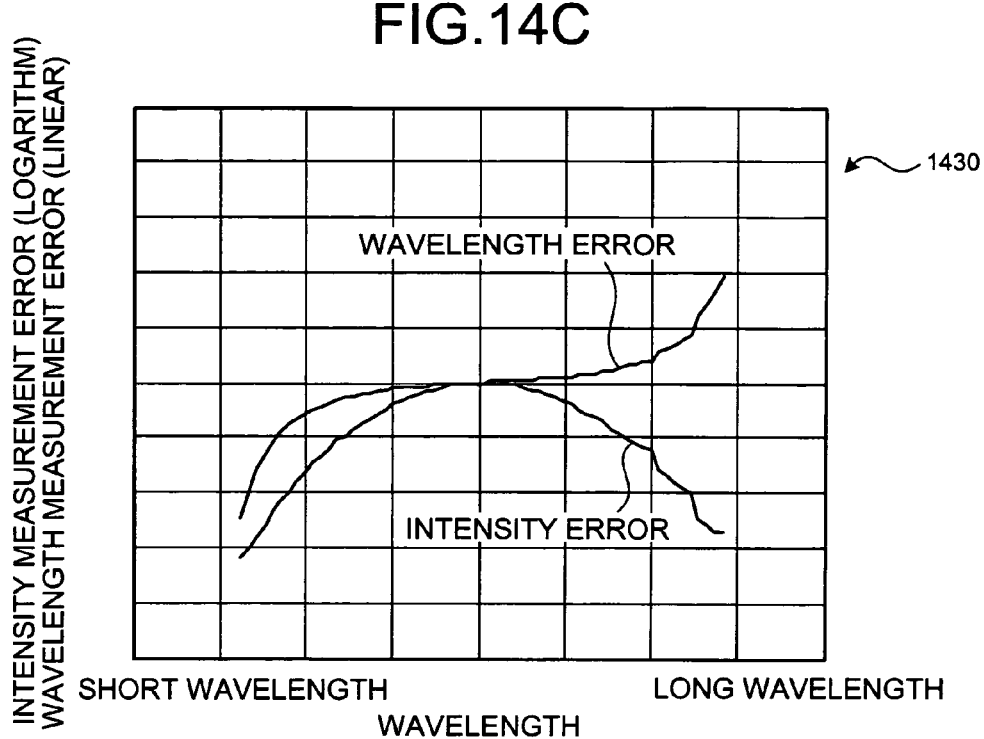
Figure 14D:
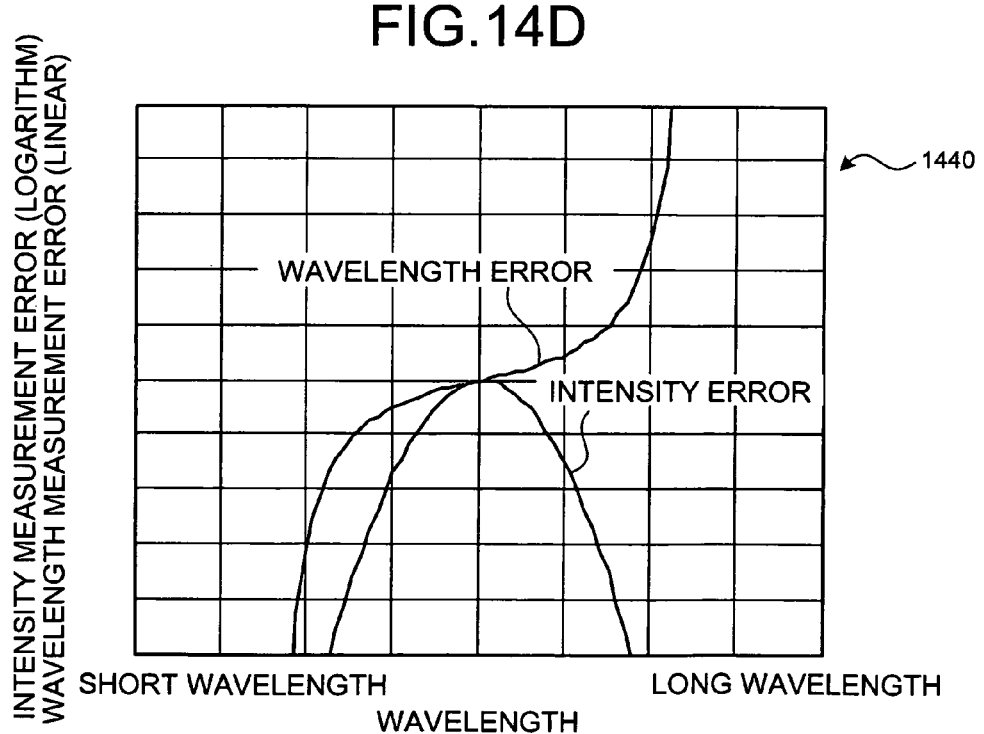

FIG. 13 is graph of a relation between a width of a core of an optical waveguide and a width of a wavelength shift of an optical signal output to the waveguide. In a graph 1300, a horizontal axis represents a width of the core 613 of the waveguide (entire width in micrometer (μm)), that is, an interval between adjacent individual output ports, and a vertical axis represents a width of a wavelength shift of the optical signal (entire width in μm) output to the waveguide. From FIG. 13, it is evident that, when the core 613 having the input waveguide end width and the output waveguide starting-point width defined above is selected so as to be larger than w0 in the graph 1300 and the input waveguide end width is larger than the output waveguide starting-point end, the input mode width can be made larger than the output mode width. As the input mode width is made larger than the output mode width, the correctable bandwidth can be increased, thereby making it possible to increase a fluctuation allowable range of a light-source wavelength for use in transmission of the WDM signal.

FIGS. 14A to 14D are graphs of measurement errors in light intensity and wavelength shift when a ratio of the waveguide interval and an output mode width are changed. In each graph, a horizontal axis represents a wavelength of the optical signal and a vertical axis represents an intensity measurement error (logarithm) of the optical signal and a wavelength measurement error (linear). Graphs 1410 and 1420 shown in FIGS. 14A and 14B, respectively, depict a case in which the first waveguide interval is smaller than the output mode width. Graphs 1430 and 1440 shown in FIGS. 14C and 14D, respectively, depict a case in which the first waveguide interval is equal to the output mode width.

In each graph, crosstalk is present between ports of the optical demultiplexing device 1200 and, to the channel to be measured, a part of light to be output from another channel is leaked. Also, the graphs 1420 and 1440 each depict the case where the crosstalk is larger than that in the graphs 1410 and 1430. Compared with the case where the crosstalk is the same (for example, the graphs 1410 and 1430 and the graphs 1420 and 1440), if the first waveguide interval is made shorter than the output mode width, even when a part of light to be output from another channel is leaked to the channel to be measured, measurement errors in light intensity and wavelength shift are small. With the provision of the taper portions 2T and 6T, the optical demultiplexing device 1200 uses the characteristic described above to reduce the measurement errors in light intensity and wavelength shift.

FIG. 15 is a schematic of an optical demultiplexing device according to a fourth embodiment of the present invention. As shown, an optical demultiplexing device 1500 is formed on the waveguide-equipped substrate 601 with the input port pattern (input waveguide) 602, the input slab pattern (input slab) 603, the phase-difference forming unit pattern (channel waveguide) 604, the output slab pattern 605, and the output port pattern (output waveguide) 606. The input port pattern 602 is provided with the taper portion 2T at a portion connecting to the input slab pattern 603 so that the pattern width gradually becomes larger as being close to the input slab pattern 603. The output port pattern 606 is provided with the taper portion 6T so that the width gradually becomes smaller as being close to the output slab pattern 605.

Also, the optical demultiplexing device 1500 is connected to the optical-electrical conversion unit 120 and the signal processing unit 130. Furthermore, as with other embodiments of the optical demultiplexing device, in the optical demultiplexing device 1200, the waveguide-equipped substrate 601 has a structure in which a waveguide formed of the core 613 is enclosed by the cladding. A cross-section of the waveguide-equipped substrate 601 has a structure as shown in FIG. 7A. A flow from inputting of WDM light to outputting of optical signals for respective channels to the optical-electrical conversion unit 120 is identical to that of the optical demultiplexing device 1200 (refer to the optical demultiplexing device according to the third embodiment).

In the fourth embodiment, the input mode width defined above is larger than the output mode width. Furthermore, the output mode width can be made larger than the first waveguide interval forming the first individual output port (for example, the individual output port 611) and the second individual output port (for example, the individual output port 612) in the same output port set. Moreover, the output waveguide starting-point width can be made smaller than the width of the pattern of the core 613 of another portion of the waveguide forming another output port pattern 606. Therefore, the structure may be as shown in FIG. 16.

Figure 16:
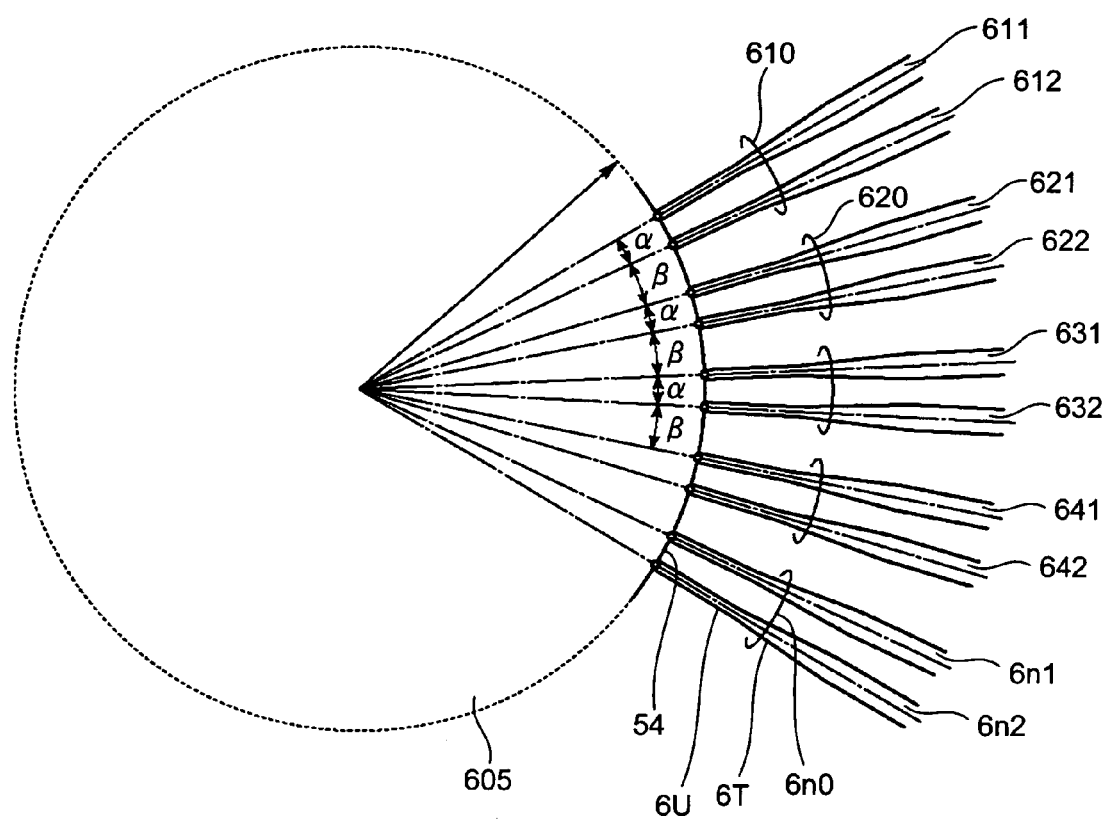
FIG. 16 is a schematic for illustrating an output slab pattern of the optical demultiplexing device according to the fourth embodiment.

FIG. 16 is a schematic for illustrating an output slab pattern of the optical demultiplexing device according to the fourth embodiment. In the optical demultiplexing device 1500, the first waveguide interval of the output slab pattern 605 is set as α, and the second waveguide interval thereof is set as β. Near a portion at which the output slab pattern 605 and the output port pattern 606 (for example, 611 and 612) are connected together, the taper portion 6T is provided at a halfway position of the individual output port patterns 611 and 612 so as to gradually become smaller in width as being close to the output slab pattern 605. The output port pattern 606 (611, 612) at the connecting portion to the output slab pattern 605 is referred as a pattern 6U having a certain small width. With such a structure, a ratio of the first waveguide interval α with respect to the output mode width can be smaller than 1. The output slab pattern 605 having such a structure can also be applied to the optical demultiplexing device 1200.

Figure 17:
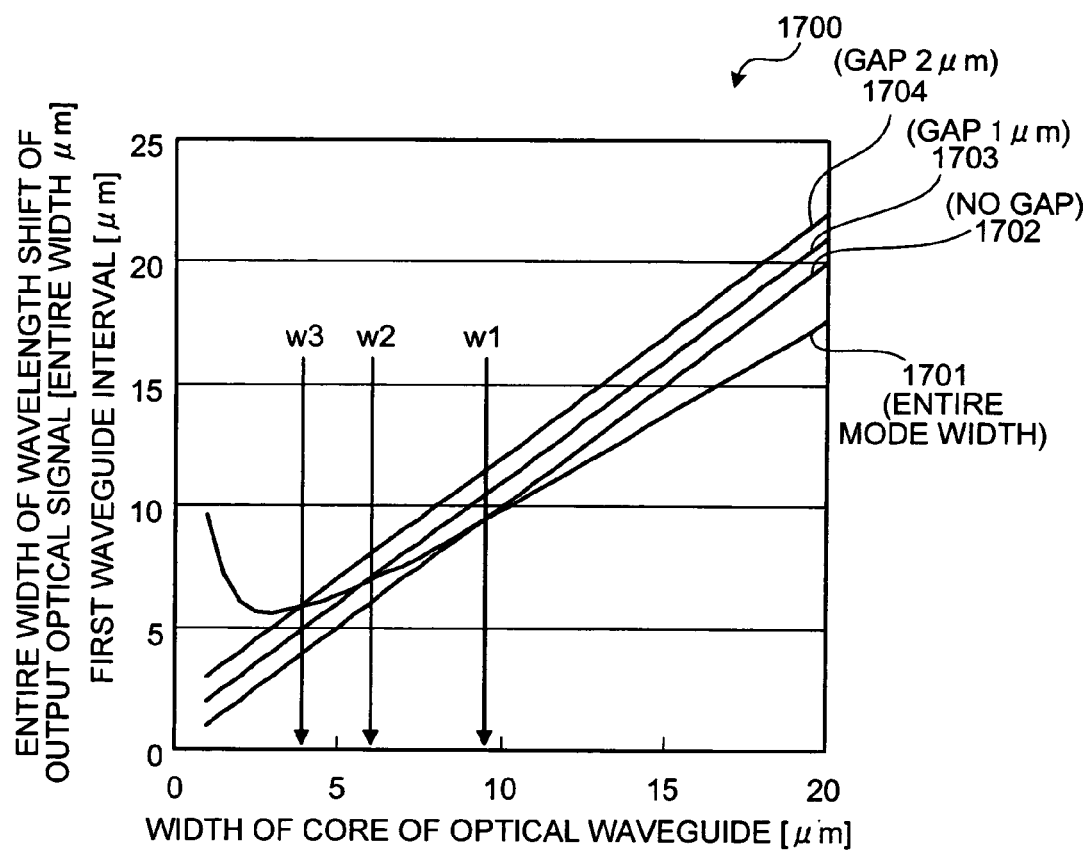
FIG. 17 is a graph of an entire width of a wavelength shift of an optical signal output to a core of the optical waveguide and dependency of core widths with a first waveguide interval.

FIG. 17 is a graph of an entire width of a wavelength shift of an optical signal output to a core of the optical waveguide and dependency of core widths with a first waveguide interval. In a graph 1700, a horizontal axis represents a width of the core 613 of the optical waveguide. A vertical axis represents an entire width (μm) of a wavelength shift of an optical signal output to each individual output port and the first waveguide interval (μm). A waveform 1701 represents an entire width of the optical signal output to each individual output port of the optical waveguide. A waveform 1702 represents the first waveguide interval without a gap between cores, a waveform 1703 represents the first waveguide interval with a gap between cores being set as 1 μm, and a waveform 1704 represents the first waveguide interval with a gap between cores being set as 2 μm.

From FIG. 17, it is evident that the ratio of the first waveguide interval with respect to the output mode width cannot be made smaller than 1 in the cases in which the core width is in an area larger than w1 in the graph 1700 when no gap between cores is present, in which the core width is in an area larger than w2 in the graph when the gap between cores is 1 atm, and in which the core width is in an area larger than w3 in the graph when the gap between cores is 2 μm. On the other hand, when the width of each core is made smaller than w1, w2, or w3 depending on the setting of the gap between cores, the ratio of the first waveguide interval with respect to the output mode width can be made smaller than 1. Therefore, the structure can be made as shown in FIG. 16.

With the operation of any of the optical demultiplexing devices 600, 1000, 1200, and 1500, in the optical monitoring device 100 according to the embodiments of the present invention, a wavelength range in which the wavelength shift can be found from a light intensity ratio in one channel is limited to a range in which the wavelength shift and the light intensity ratio have a one-to-one correspondence, that is, the correctable bandwidth. Therefore, such a range in which the wavelength shift and the light intensity ratio have a one-to-one correspondence is preferably as large as possible. For this, the following two conditions have to be satisfied.

1. Conditions for achieving a one-to-one correspondence between the wavelength shift and the light intensity ratio The crosstalk between individual output ports in an output port set should be relatively large, at least in the range of the correctable bandwidth.

2. Condition of the level of crosstalk

On the other hand, a crosstalk to individual output ports forming adjacent output port sets causes a measurement error. Therefore, such crosstalk to the individual output ports should be reduced to a level sufficient to satisfy accuracy required.

Figure 18:
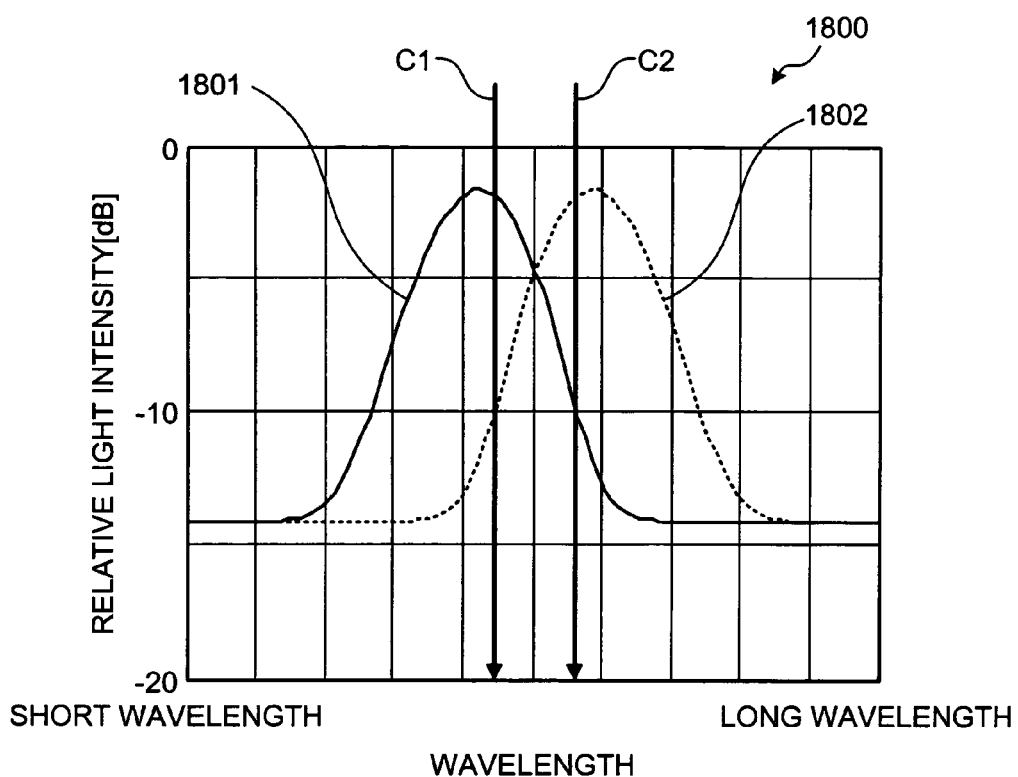
FIG. 18 is a graph for explaining a scheme of setting a correctable band.

FIG. 18 is a graph for explaining a scheme of setting a correctable band. In a graph 1800, a horizontal axis represents a wavelength of an optical signal, and a vertical axis represents a relative light intensity of the optical signal. In the graph 1800, C1 denotes a wavelength having the center wavelength of one of the output ports forming the same output port set (for example, the output port 611), and a waveform 1801 represents a light intensity of the optical signal output from that output port. Also, C2 denotes a wavelength having the center wavelength of the other one of the output ports forming the same output port set (for example, the output port 612), and a waveform 1802 represents a light intensity of the optical signal output from that output port. In such an output port set, a width from C1 to C2 is the correctable bandwidth. Furthermore, a minimum value of each of the waveforms 1801 and 1802 has a light intensity to some degree because accumulation of crosstalk from other channels has an influence on the optical signal as a background.

Figure 19:
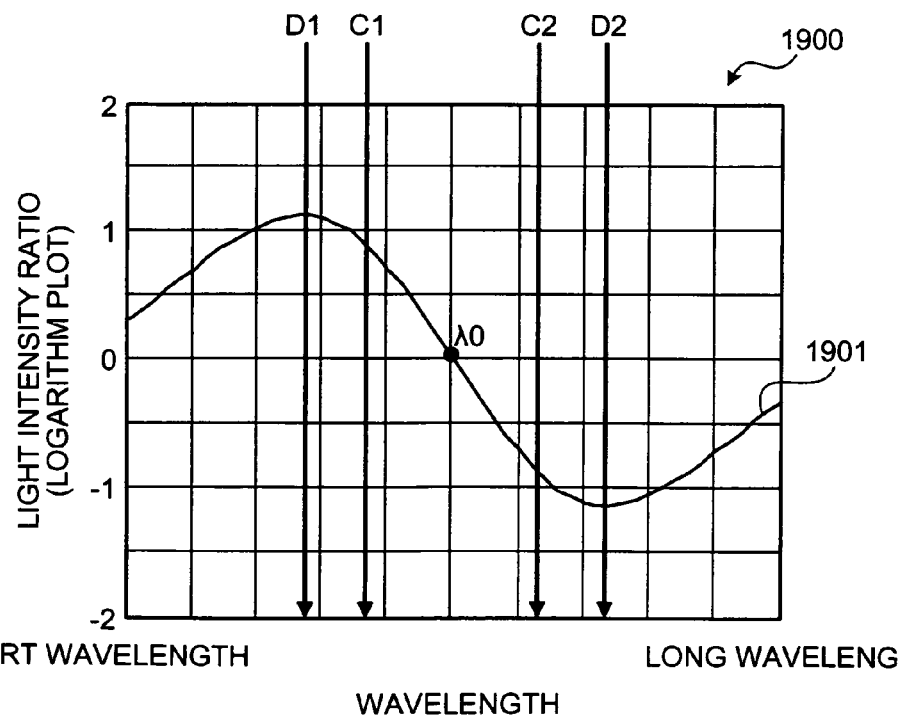
FIG. 19 is a graph of wavelength dependency of a light intensity ratio of lights output from two ports.

FIG. 19 is a graph of wavelength dependency of a light intensity ratio of lights output from two ports. In a graph 1900, a horizontal axis represents a wavelength of an optical signal, and a vertical axis represents a relative light intensity ratio of the optical signal (logarithm plot). In the graph 1900, a waveform 1901 represents a light intensity ratio between two individual output ports under the same conditions. As with C1 and C2 shown in FIG. 18, C1 and C2 shown in the graph 1900 each represent a center wavelength of each of two individual output ports forming the same output port set. Moreover, λ0 represents a center wavelength of the output port set. D1 represents a wavelength with which the light intensity ratio is a maximum when the optical signal is input to the output port set. D2 represents a wavelength with which the light intensity ratio is a minimum when the optical signal is input to the output port set.

From the graph 1900, it is evident that, when a parameter representing a distance corresponding to a spatial position corresponding to the center wavelength of all of the waveguides forming the output port set of a target channel is o, a parameter representing a distance corresponding to the first waveguide interval is u1, and a parameter representing a distance corresponding to the second waveguide interval is u2, a ratio of the output waveguide starting-point width and the first waveguide interval is set to be 1:1+v. Furthermore, the second wavelength interval is set so that crosstalk with an adjacent channel in a wavelength corresponding to a position of $o\pm\{u1-(u2\times v)/2\}$ is equal to or smaller than a predetermined value.

In the range set as described above, it is evident that the light intensity ratio and the wavelength shift have a one-to-one correspondence. Therefore, the correctable bandwidth can be set in a relatively easy manner, and a relatively wide correctable bandwidth can be achieved.

Furthermore, when a wavelength where the light intensity ratio, which is a relative intensity, of light of one of intra-set adjacent ports is equal to that of light of the other one of intra-set adjacent port is $\lambda 0$, a wavelength where, when a specific output waveguide of one channel of WDM light is superposed with unwanted emission light output from another channel and mixed into the one channel (blended and output together with the original light), a relative light intensity ratio of light output from the intra-set adjacent ports is maximum is $\Delta 1$, and a wavelength interval of WDM light is $\Delta\lambda$, the second wavelength interval may be set so that crosstalk to the channel from another adjacent channel at a wavelength of $\lambda 2=\lambda 0\pm\{\Delta\lambda-(|\lambda 0-\lambda 1|)\}$ is equal to or smaller than a predetermined value.

With such setting, a further wider correctable bandwidth can be achieved. For example, the correctable bandwidth can be set between the wavelength denoted as D1 in the graph 1900 shown in FIG. 19 where the light intensity ratio is a maximum and the wavelength denoted as D2 where the light intensity ratio is a minimum. Therefore, a widest wavelength range where the light intensity ratio and the wavelength shift have a one-to-one correspondence can be set as a correctable bandwidth.

Figure 20A:
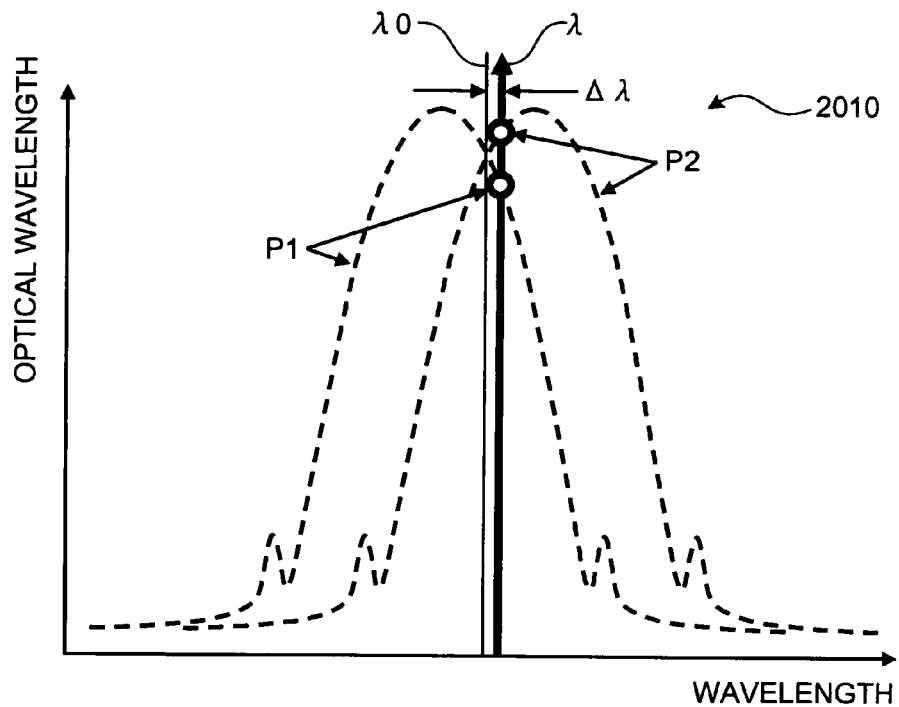
FIGS. 20A and 20B are graphs of an output of an optical-electrical conversion unit when light having a wavelength of λ0 is incident to the optical monitoring device according to the embodiments of the present invention.

FIG. 20A is a graph of an output of an optical-electrical conversion unit when light having a wavelength of $\lambda 0$ is incident to the optical monitoring device according to the embodiments of the present invention. In a graph 2010, a horizontal axis represents a wavelength, and a vertical axis represents a light intensity. In the graph 2010, an example of outputs of the optical-electrical conversion unit 120 is as shown in FIG. 1. P1 and P2 are examples of outputs when optical signals output from the same output port set are input to the optical-electrical conversion unit 120, wherein light to be measured $\lambda$ having a wavelength shift from a center wavelength $\lambda 0$ of the output port set by $\Delta\lambda$ is output.

Figure 20B:
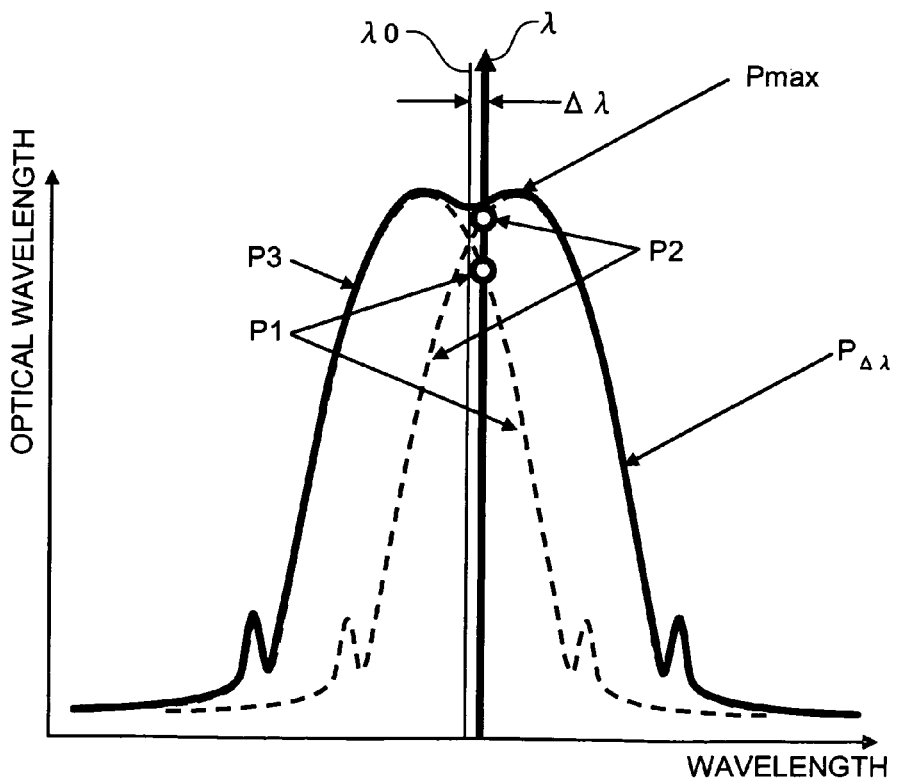

As FIG. 20A, FIG. 20B is a graph depicting outputs from the optical-electrical converting unit when light having a wavelength $\lambda$ is incident to the optical monitoring device according to the present invention, with a horizontal axis representing a wavelength and a vertical axis representing a light intensity. A sum of outputs of P1 and P2 is taken as P3. P3 represents $\Delta\lambda$-dependency of the sum of P1 and P2, and a maximum value of P3 is denoted as Pmax. To correct a measurement error in the case of the light $\lambda$ to be measured, a correction coefficient is used.

Figure 20C:
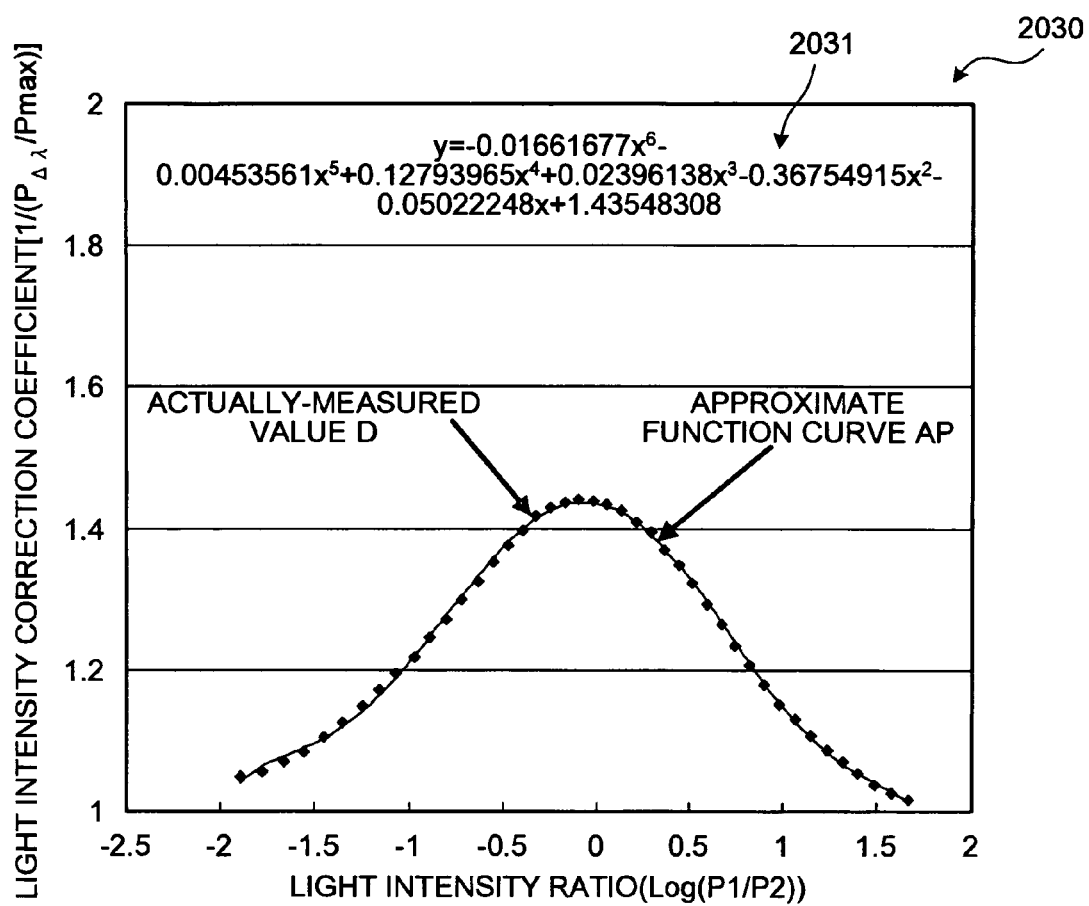
FIG. 20C is a plot of an approximate curve of a function representing a light intensity correction coefficient.

FIG. 20C is a plot of an approximate curve of a function representing a light intensity correction coefficient. In a graph 2030, a horizontal axis represents a light intensity ratio, which is a ratio (logarithm) of P1 and P2 with the wavelength of the light to be measured $\lambda$ shown in FIG. 20A being changed. A vertical axis represents, as the light intensity correction coefficient, an inverse of a value obtained by dividing P3 by Pmax, where a difference between the wavelength of the light to be measured $\lambda$ and the center wavelength $\lambda 0$ shown in the graph 2010 of FIG. 20A is taken as $\Delta\lambda$ and a maximum value of the sum P3 of P1 and P2 ($\Delta\lambda$ dependency of the sum of P1 and P2) is taken as Pmax. Plot points represent actually-measured values D, and a curve overlaying on the plot points represents an approximate function curve $\Delta P$. With the function approximate curve AP shown in the graph 2030, approximate function can be achieved as in an equation 2031 from the actually-measured values D.

Figure 21A:
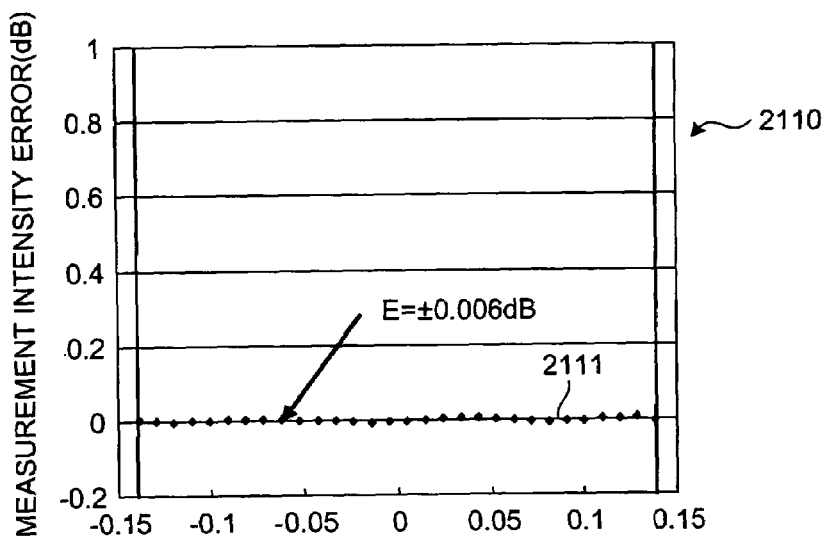
FIG. 21A is a graph of a measurement intensity error of the optical monitoring device when the present invention is applied.

FIG. 21A is a graph of a measurement intensity error of the optical monitoring device when the present invention is applied. In a graph 2110, a horizontal axis represents a wavelength shift $\Delta\lambda$ with respect to a filter center wavelength, and a vertical axis represents a measurement intensity error (dB). A waveform 2111 represents a result of light intensity measurement by using the approximate function curve AP shown in FIG. 20C as a correction coefficient corresponding to each light intensity ratio and performing an operation of finding the product of the corresponding light intensity ratio and the correction coefficient. When a waveform shift occurs in a range of $-0.015$ nanometer (nm) to $+0.015$ nm from the center wavelength, an error E is within $\pm 0.006$ dB.

Figure 21B:
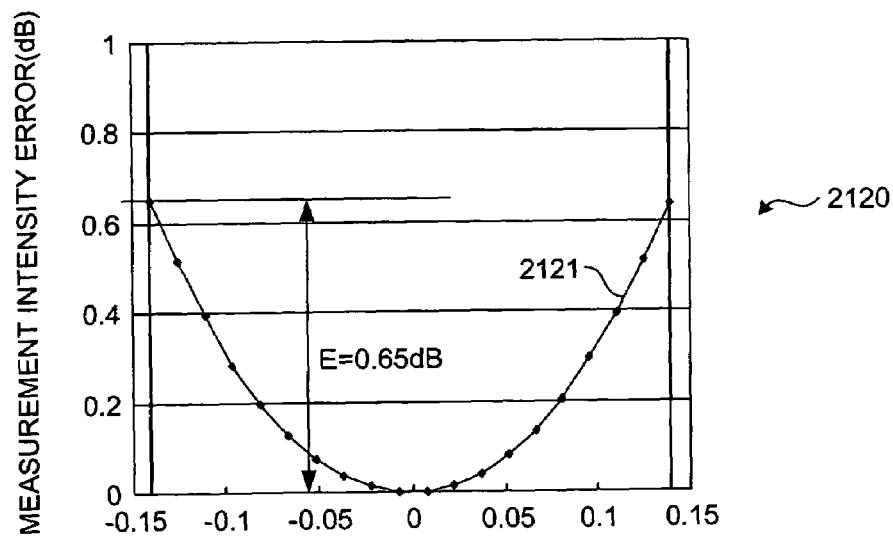
FIG. 21B is a graph of a measurement intensity error of the optical monitoring device when the AWG is applied.
Figure 24:
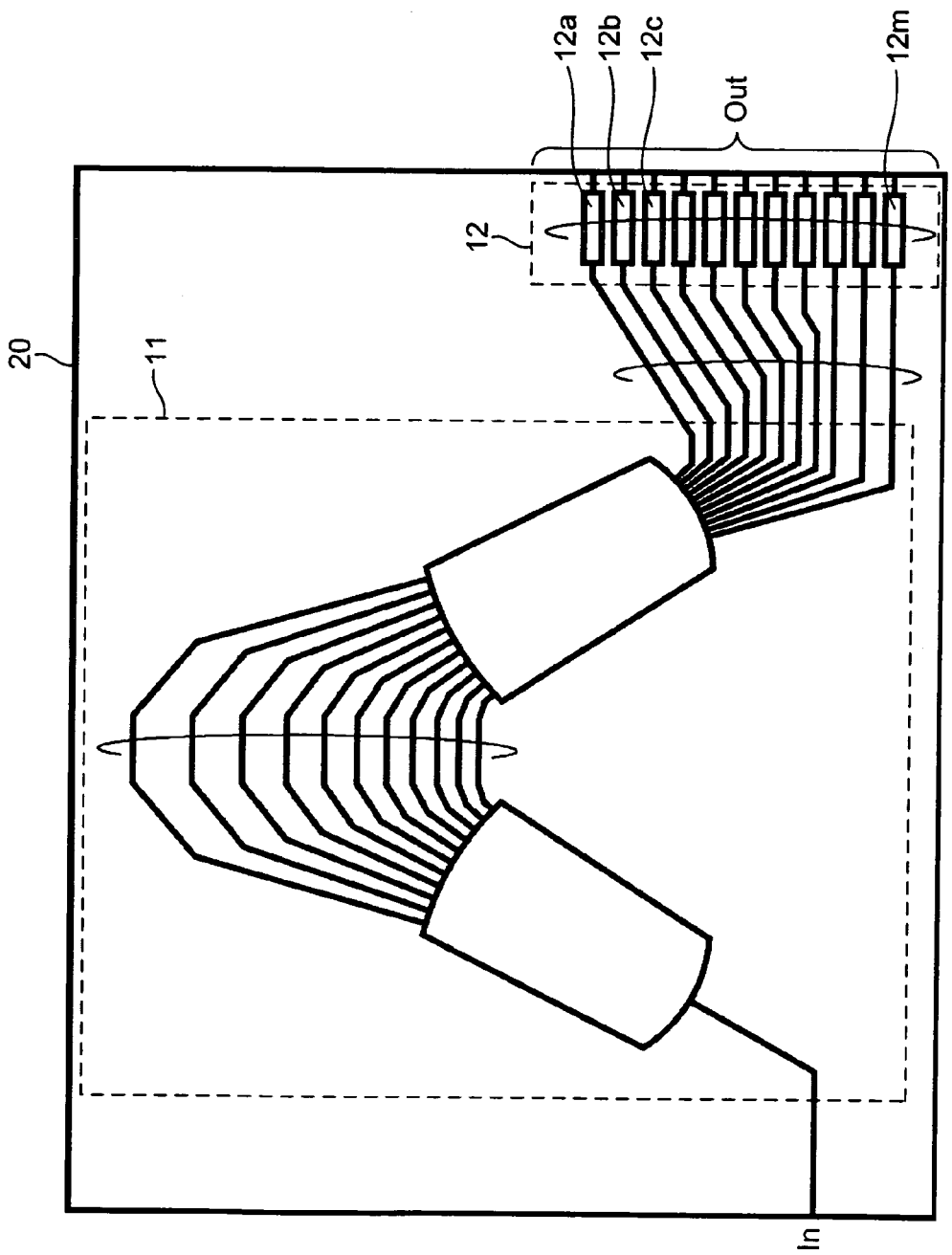
FIG. 24 is a schematic of an optical demultiplexing unit of the optical monitoring device shown in FIG. 23.
Figure 25:
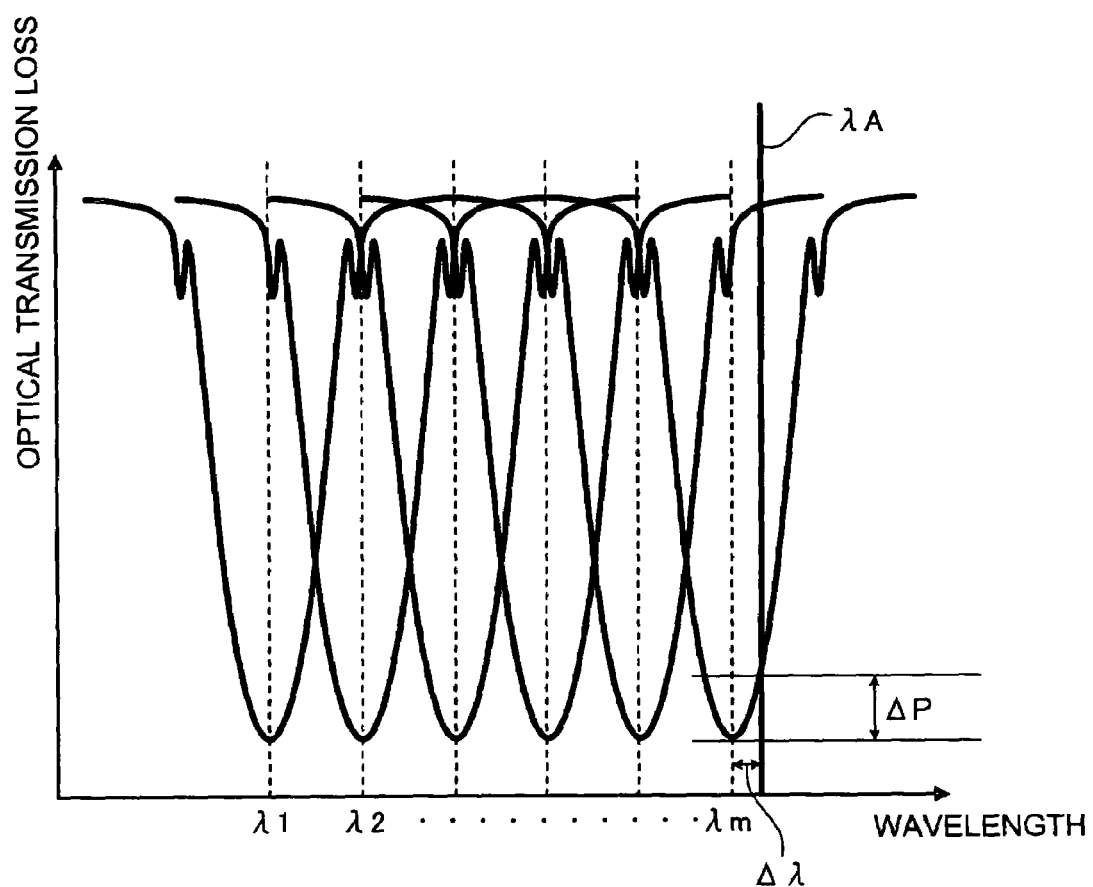
FIG. 25 is a graph of an optical transmission loss in a spectroscopic unit in the conventional optical monitoring device.

On the other hand, FIG. 21B is a graph of a measurement intensity error of the optical monitoring device when the AWG is applied. Similarly to the graph 2110 (see FIG. 21A), in a graph 2120, a horizontal axis represents a wavelength shift $\Delta\lambda$ with respect to a filter center wavelength, and a vertical axis represents a measurement intensity error (dB). A waveform 2121 represents a result of light intensity measurement by using the conventional optical demultiplexing unit 11 shown in FIG. 24. It is evident that an error E when the waveform is shifted from the center wavelength in a range of $-0.015$ nm to $+0.015$ nm is significantly large.

In this way, a correction coefficient is found for each channel by using any of the optical demultiplexing devices 600, 1000, 1200, and 1500 according to the embodiments of the present invention. Thus, even when a wavelength shift $\Delta\lambda$ ($\Delta\lambda=\lambda-\lambda 0$) occurs between the wavelength $\lambda$ of the light to be measured and the center wavelength $\lambda 0$ of each individual output port and then the wavelength shift $\Delta\lambda$ is further changed, a measurement error in light intensity can be reduced. In addition, as in the graph 400 shown in FIG. 4, for example, in the wavelength range corresponding to the range between the maximum value Rmax and the minimum value Rmin, the light intensity ratio and the wavelength shift $\Delta\lambda$ have a one-to-one correspondence. Therefore, the center wavelength of the light to be measured can be found from the light intensity ratio.

Figure 22:
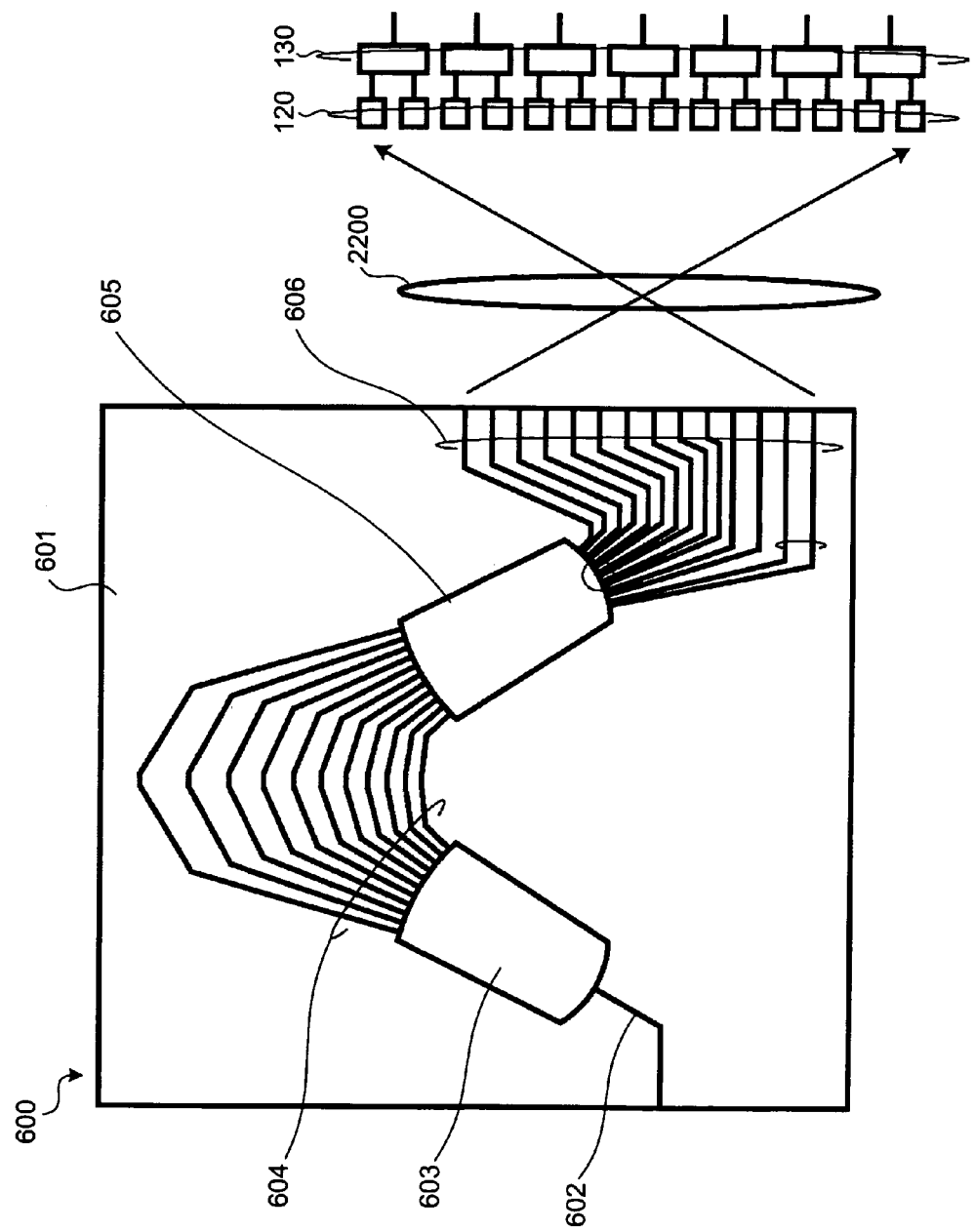
FIG. 22 is a schematic of an optical monitoring device using the optical demultiplexing device according to the embodiments of the present invention.
Figure 23:
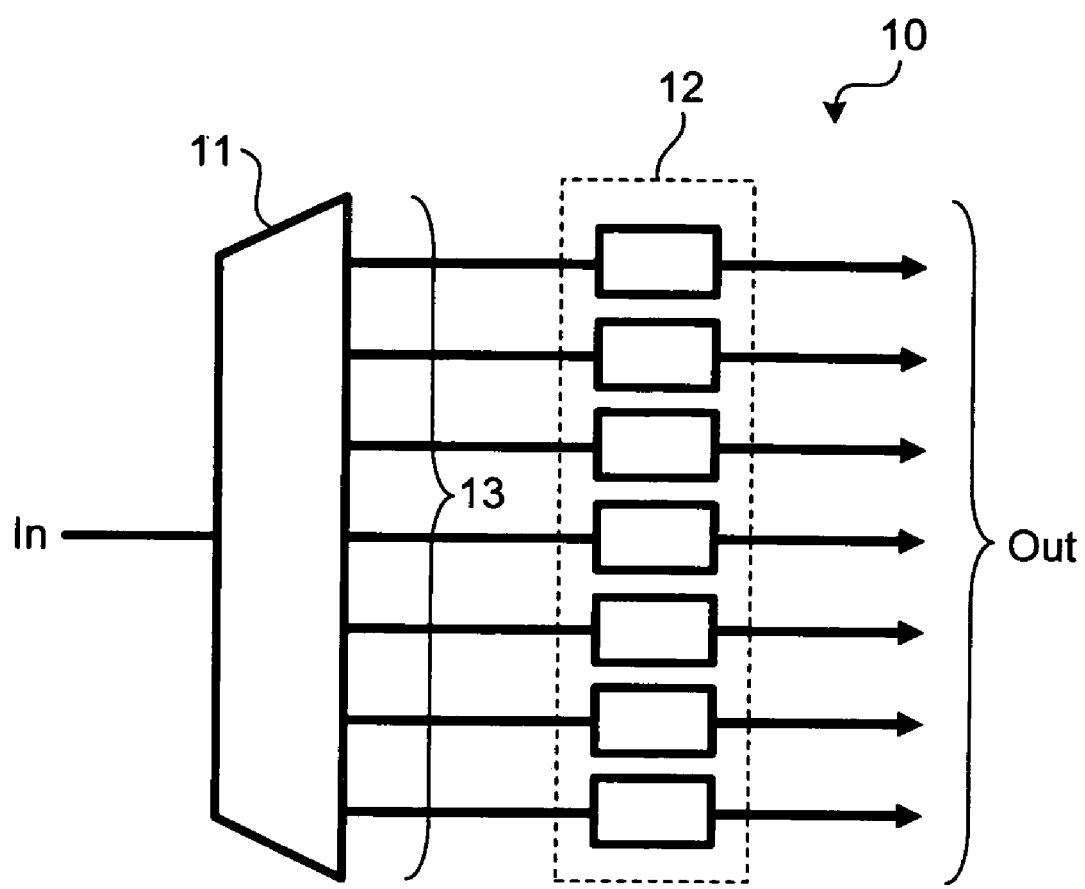
FIG. 23 is a schematic of a conventional optical monitoring device.

FIG. 22 is a schematic of an optical monitoring device using the optical demultiplexing device according to the embodiments of the present invention. As shown, an image-formation lens 2200 may be used for optical coupling between the optical demultiplexing device 600 and the optical-electrical conversion unit 120. With the image-formation lens 2200, the port interval of the output port pattern 606 does not have to be matched with the port interval of the optical-electrical conversion unit 120. By adjusting the image-formation lens 2200, the port interval of the optical-electrical conversion unit 120 can be changed. Therefore, a spot size of light on a portion where the light is incident to the optical-electrical conversion unit 120 can be changed to an optimum spot size for optical connection with the optical-electrical conversion unit 120, thereby reducing a coupling loss. Furthermore, in the optical monitoring device, an element such as a photodiode, which is vulnerable to water, is generally used for the optical-electrical conversion unit 120, and therefore at least the portion of the optical-electrical conversion unit 120 has to be hermetically sealed. This example of the structure advantageously allows easy hermetic sealing. Although the optical demultiplexing device 600 is used in this example of the structure shown in the drawing, any of the optical demultiplexing devices 600, 1000, 1200, and 1500 described in the first to fourth embodiments of the optical demultiplexing device can be applied.

As described, according to the optical demultiplexing device and the optical monitoring device, an output intensity ratio between ports of a specific port pair is measured, and based on the measurement information, sensitivity correction is performed. Thus, a measurement error in light intensity of an optical signal for each channel of WDM light can be significantly reduced. Also, the wavelength of the optical signal can be measured.

According to the present invention, it is possible to reduce an intensity measurement error of transmission light due to a wavelength shift, to simplify assembly of the device, and to downsize a device.

Moreover, according to the present invention, it is possible to monitor a wavelength of light to be measured while reducing the intensity measurement error, simplifying assembly, and downsizing the devise.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical demultiplexing device that splits a wavelength division multiplexing (WDM) signal into a plurality of channel signals of an identical diffraction order, comprising:
   a first output port set that includes a first output port and a second output port to each of which one of the channel signals is input so that a wavelength shift of the channel signal from a center wavelength of the first output port set is calculated based on an intensity ratio of an optical signal output from the first output port and an optical signal output from the second output port; and
   a second output port set that includes a third output port and a fourth output port to each of which another one of the channel signals is input so that a wavelength shift of the another channel signal from a center wavelength of the second output port set is calculated based on an intensity ratio of an optical signal output from the third output port and an optical signal output from the fourth output port, wherein:
   the second output port set is adjacent to the first output port set, the third output port is adjacent to the second output port, and
   optical crosstalk between the first output port and the second output port and optical crosstalk between the third output port and the fourth output port are larger than optical crosstalk between the second output port and the third output port.

2. The optical demultiplexing device according to claim 1, wherein
   the optical demultiplexing device includes:
   an input waveguide;
   an input slab connected to the input waveguide;
   a plurality of output waveguides including a first output waveguide, a second output waveguide, a third output waveguide, and a fourth output waveguide, which serve as the first output port, the second output port, the third output port, and the fourth output port, respectively; and
   an output slab connected to the output waveguides; wherein
   a first waveguide interval between the first output waveguide and the second output waveguide or between the third output waveguide and the fourth output waveguide is smaller than a second waveguide interval between the second output waveguide and the third output waveguide.

3. The optical demultiplexing device according to claim 2, wherein:
   the input slab and the output slab are formed by a single slab with an echelette grating.

4. The optical demultiplexing device according to claim 2, wherein
   a width of the input waveguide at a portion connected to the input slab is larger than a width of each of the output waveguides at a portion connected to the output slab.

5. The optical demultiplexing device according to claim 2, wherein
   an input-mode width that is a width of a light intensity distribution of a fundamental guided mode in the input waveguide at a portion connected to the input slab is larger than an output-mode width that is a width of a light intensity distribution of a fundamental guided mode in each of the output waveguides at a portion connected to the output slab.

6. The optical demultiplexing device according to claim 5, wherein
   the first waveguide interval is smaller than the output-mode width.

7. The optical demultiplexing device according to claim 2, wherein
   a width of each of the output waveguides is smallest at a portion connected to the output slab.

8. The optical demultiplexing device according to claim 7, wherein
   each of the output waveguides includes a taper portion at the portion connected to the output slab.

9. The optical demultiplexing device according to claim 2, wherein
   a ratio of a width of each of the output waveguides at a portion connected to the output slab and the first waveguide interval is set to be 1:1+v, and the second wavelength interval is set so that optical crosstalk between the second output waveguide and the third output waveguide in a wavelength corresponding to a position of $o \pm \{u1-(u2 \times v)/2\}$ is equal to or smaller than a predetermined value, where
   o represents a distance corresponding to a spatial position corresponding to a center wavelength of the first output port set or the second output port set,
   u1 represents a distance corresponding to the first wavelength interval, and
   u2 represents a distance corresponding to the second wavelength interval.

10. The optical demultiplexing device according to claim 2, wherein
    the second waveguide interval is set so that optical crosstalk between the second output waveguide and the third output waveguide in a wavelength of $$\lambda2 = \lambda0 \pm \{\Delta\lambda - (\lambda0 - \lambda1)\}$$

is equal to or smaller than a predetermined value, where

λ0 represents a wavelength where the intensity ratio becomes equal to 1,

λ1 represents a wavelength where the intensity ratio becomes maximum, and

Δ2 represents a wavelength interval of the WDM signal.

11. An optical monitoring device comprising:

an optical demultiplexing unit that splits a wavelength division multiplexing (WDM) signal into a plurality of channel signals of an identical diffraction order, and includes an output port set that has a first output port and a second output port to each of which one of the channel signals is input; and a signal processing unit that calculates a wavelength shift Δλ of the channel signal from a center wavelength of the output port set based on an intensity ratio of an optical signal output from the first output port and an optical signal output from the second output port.

12. The optical monitoring device according to claim 11, further comprising:

a second output port set that includes third output port and a fourth output port to each of which another one of the channel signals is input, wherein the second output port set is adjacent to the first output port set, the third output port is adjacent to the second output port, and optical crosstalk between the first output port and the second output port and optical crosstalk between the third output port and the fourth output port are larger than optical crosstalk between the second output port and the third output port.

13. The optical monitoring device according to claim 11, further comprising:

an optical-electrical converting unit that detects intensities of optical signals output from the first output port and the second output port, and converts the optical signals into electrical signals having intensities corresponding to the intensities of the optical signals, wherein the signal processing unit calculates the intensity ratio based on the intensities of the electrical signals, corrects the intensity ratio using a correlational function, and calculates the wavelength shift Δλ based on the corrected intensity ratio.

14. The optical monitoring device according to claim 13, wherein the signal processing unit includes information that defines the relation between the intensity ratio and the wavelength shift Δλ to create the correlational function.

15. The optical monitoring device according to claim 13, wherein the signal processing unit includes an approximate function that defines the relation between the intensity ratio and the wavelength shift Δλ as the correlational function.

16. The optical processing device according to claim 15, wherein the approximate function is defined based on data that is obtained by measuring correlation between the intensity ratio and the wavelength shift Δλ.

17. The optical monitoring device according to claim 13, wherein the signal processing unit multiplies the intensity ratio by a correction coefficient of $1/(P_{\Delta\lambda}/P_{max})$ to correct the intensity ratio, where $P_{\Delta\lambda}$ represents a sum of intensities of optical signals output from the first output port and the second output port, and $P_{max}$ represents a maximum value of $P_{\Delta\lambda}$.

18. The optical monitoring device according to claim 11, wherein the signal processing unit further calculates a center wavelength of an optical signal passing through the output port set.

* * * * *